US012299824B2

(12) United States Patent
Al-Sharieh et al.

(10) Patent No.: US 12,299,824 B2
(45) Date of Patent: May 13, 2025

(54) AUTOPLAY SESSIONS FOR VIRTUAL TOURS

(71) Applicant: Giraffe360 Limited, London (GB)

(72) Inventors: Ryan Al-Sharieh, Wichita, KS (US); Lauris Bricis, Plavinas (LV); Harijs Grinbergs, Riga (LV); Reinis Aņiskovičs, Rezekne (LV)

(73) Assignee: Giraffe360 Limited (GB)

( * ) Notice: Subject to any disclaimer, the term of this patent is extended or adjusted under 35 U.S.C. 154(b) by 5 days.

(21) Appl. No.: 18/082,269

(22) Filed: Dec. 15, 2022

(65) Prior Publication Data

US 2023/0386142 A1 Nov. 30, 2023

Related U.S. Application Data

(60) Provisional application No. 63/346,530, filed on May 27, 2022.

(51) Int. Cl.
*G06T 19/00* (2011.01)
*G06Q 50/16* (2012.01)
*G06V 10/774* (2022.01)

(52) U.S. Cl.
CPC .......... *G06T 19/003* (2013.01); *G06Q 50/16* (2013.01); *G06V 10/774* (2022.01)

(58) Field of Classification Search
CPC ..... G06T 19/003; G06V 10/774; G06Q 50/16
See application file for complete search history.

(56) References Cited

U.S. PATENT DOCUMENTS

2001/0002126 A1* 5/2001 Rosenberg ............ A63F 13/285 345/156
2001/0030658 A1* 10/2001 Rosenberg ............. G06F 3/011 715/701
2001/0044858 A1* 11/2001 Rekimoto ............... G06F 3/011 710/1
2002/0021283 A1* 2/2002 Rosenberg .............. G06F 3/016 345/156
2003/0016207 A1* 1/2003 Tremblay .............. G06F 3/0484 345/156

(Continued)

FOREIGN PATENT DOCUMENTS

WO WO-2010009149 A2 * 1/2010 ........... G06F 1/1613

*Primary Examiner* — Nicholas Augustine
(74) *Attorney, Agent, or Firm* — Finnegan, Henderson, Farabow, Garrett & Dunner, LLP

(57) ABSTRACT

The present disclosure relates generally to systems and methods for generating an autoplay session for a virtual tour. In one embodiment, a method may include accessing virtual tour data associated with a property, the virtual tour data including at least a first image of the property associated with a first waypoint location and a second image of the property associated with a second waypoint location; generating, based on the virtual tour data, autoplay session data associated with the property, the autoplay session data indicating a series of views within the property, the series of views including at least: a first view represented by at least a portion of the first image, and a second view represented by at least a portion of the second image, the second view to be presented after the first view; and causing the series of views to be displayed to a user via a user interface.

19 Claims, 12 Drawing Sheets

(56) References Cited

U.S. PATENT DOCUMENTS

| | | | | |
|---|---|---|---|---|
| 2006/0287025 | A1* | 12/2006 | French | A63F 13/843 463/4 |
| 2007/0132785 | A1* | 6/2007 | Ebersole | A63F 13/213 345/633 |
| 2008/0215994 | A1* | 9/2008 | Harrison | H04L 67/131 715/757 |
| 2010/0045619 | A1* | 2/2010 | Birnbaum | G06F 3/04845 345/173 |
| 2010/0130296 | A1* | 5/2010 | Ackley | A63G 7/00 472/61 |
| 2010/0234094 | A1* | 9/2010 | Gagner | G07F 17/3202 463/20 |
| 2018/0143756 | A1* | 5/2018 | Mildrew | G06T 17/05 |
| 2018/0350126 | A1* | 12/2018 | Oh | G06T 3/20 |
| 2019/0065027 | A1* | 2/2019 | Hauenstein | G06F 3/014 |
| 2019/0236732 | A1* | 8/2019 | Speasl | G05D 1/101 |
| 2020/0004401 | A1* | 1/2020 | Hwang | G06F 3/04815 |
| 2020/0005026 | A1* | 1/2020 | Andersen | A63F 13/428 |
| 2020/0005539 | A1* | 1/2020 | Hwang | G06F 3/167 |
| 2022/0189075 | A1* | 6/2022 | Lynch | G06T 11/00 |

* cited by examiner

AUTOPLAY SESSIONS FOR VIRTUAL TOURS

CROSS REFERENCE TO RELATED APPLICATION

This application claims the benefit of priority of U.S. Provisional Application No. 63/346,530, filed May 27, 2022. The foregoing application is incorporated herein by reference in its entirety.

BACKGROUND

Technical Field

The present disclosure relates generally to the capture, analysis, and management of data associated with a property. More specifically, the present disclosure relates to systems, methods, and devices for generating autoplay sessions for virtual tour data.

Background Information

Real estate professionals, such as agents, increasingly utilize technology to improve the experience for their clients or other end users. For example, many real estate platforms offer virtual tours, enabling a user to navigate through property in a virtual environment. This may include presenting one or more images captured from within the property in a manner that simulates a user physically walking through the property. For example, the user may click on portions of an image to "move" to other areas of a property. The user may also pan around the virtual environment to view the property from different angles.

These forms of virtual tours, however, can be burdensome on users. For example, especially with relatively large properties, a user may be required to click hundreds of times to view an entire property. Further, a user may miss various features or areas of the property, especially if they are unfamiliar with it. For example, a user may inadvertently navigate past rooms, hallways, architectural features, or other features in the property that may have been of interest to the user.

Accordingly, in view of these and other deficiencies in current techniques, technical solutions are needed to provide virtual tours of a property with minimal interaction required by an end user. The disclosed solutions are aimed at automatically generating an "autoplay" walkthrough of a property, which may allow users to view a property virtually without requiring continuous navigation by the user. This autoplay walkthrough may be generated in a manner such that a user is shown features or areas of the property that may be of particular importance to the user. Further, solutions may advantageously allow the user to interact with the autoplay session to pause, take control, and/or resume the autoplay session.

SUMMARY

Embodiments consistent with the present disclosure provide systems and methods for generating and presenting an autoplay session for a virtual tour of a property.

In an embodiment, a system for generating an autoplay session may include at least one processor. The at least one processor may be configured to access virtual tour data associated with a property, the virtual tour data including at least a first image of the property associated with a first waypoint location and a second image of the property associated with a second waypoint location; and automatically generate, based on the virtual tour data, autoplay session data associated with the property, the autoplay session data indicating a series of views within the property. The series of views may include at least: a first view represented by at least a portion of the first image at the first waypoint location, the first view being selected based on at least one feature of interest represented in the first image, and a second view represented by at least a portion of the second image at the second waypoint location, the second view to be presented after the first view. At least one processor may further be configured to cause the series of views to be displayed to a user via a user interface In an embodiment, a computer-implemented method for generating an autoplay session may include accessing virtual tour data associated with a property, the virtual tour data including at least a first image of the property associated with a first waypoint location and a second image of the property associated with a second waypoint location; and automatically generating, based on the virtual tour data, autoplay session data associated with the property, the autoplay session data indicating a series of views within the property. The series of views may include at least: a first view represented by at least a portion of the first image at the first waypoint location, the first view being selected based on at least one feature of interest represented in the first image, and a second view represented by at least a portion of the second image at the second waypoint location, the second view to be presented after the first view. The method may further include causing the series of views to be displayed to a user via a user interface.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
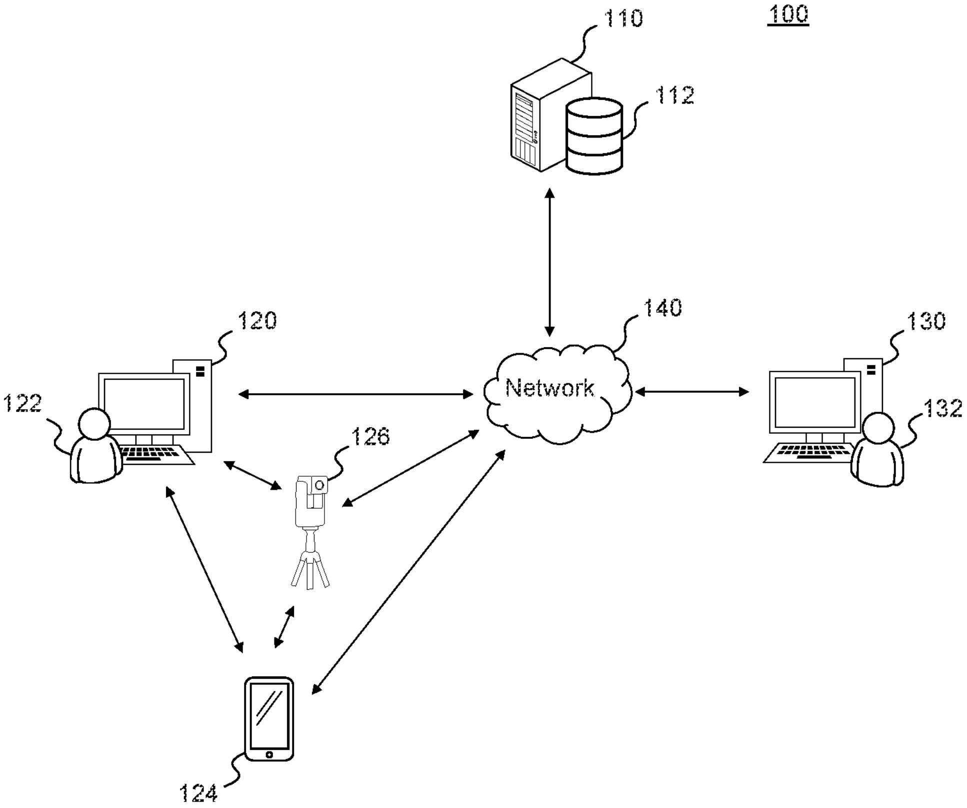
FIG. 1 is a diagrammatic representation of an example system for capturing and managing property data, consistent with embodiments of the present disclosure.

Unless specifically stated otherwise, throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include actions and/or processes of a computer that manipulate and/or transform data into other data, the data represented as physical quantities, for example such as electronic quantities, and/or the data representing physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or sequentially.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The various embodiments described herein generally relate to the capture, storage, management, analysis, sharing, and presentation of data associated with a property. As used herein, a property may refer to any form of physical asset, and may refer to a piece of land or real estate, which may include one or more buildings or other improvements or enhancements. For example, a property may refer to a residential property (e.g., single family detached home, a single family semi-detached home, a townhome, an apartment, a multi-family residential, mobile homes, etc.), a commercial property (e.g., an office space, a retail space, a hotel room, a mixed-use space, etc.), an industrial property (e.g., manufacturing facilities, warehouses, showrooms, data centers, laboratories, research facilities, etc.), land, or any other type of real estate property. In some embodiments, a property may refer to a vehicle or other form of property that may not necessarily be tied to a specific physical location. For example, a property may refer to a recreational vehicle, such as a motorhome, campervan, coach, camper trailer (e.g., fifth-wheel trailers, popup campers, and truck campers), ships, airplanes, or the like. In some embodiments, a property may include virtual spaces, such as a virtual representation of a building or a space within a virtual setting. While real estate properties are used by way of example throughout the present disclosure, one skilled in the art would recognize that a property may refer to various other objects that may be toured or inspected virtually.

Consistent with embodiments of the present disclosure, data associated with one or more properties may be collected, analyzed, and shared in various ways. In the example of real estate properties, such as homes, apartments, offices, or other buildings, this data may include images captured from within the property. For example, a user, such as a real estate agent, may capture one or more images of the property using an image capture device, as described in further detail below. These images, along with various other forms of data may be uploaded to a server, which may perform various processing operations as described herein. The data (including data having been processed by the server) may then be shared with various other entities or users, such as prospective buyers or renters of the property. The data may be presented in a manner allowing the users to interact with the data and visualize the property.

Systems consistent with some disclosed embodiments may include one or more servers configured to communicate with various computing devices or entities. As used herein, a server may be any form of computing device capable of accessing data through a network and processing the data consistent with embodiments of the present disclosure. In some embodiments, the server may include a single computing device, such as a server rack. In other embodiments, the remote server may include multiple computing devices, such as a server farm or server cluster. The remote server may also include network appliances, mobile servers, cloud-based server platforms, or any other form of central computing platform. Various example remote servers are described in greater detail below.

FIG. 1 is a diagrammatic representation of an example system 100 for capturing and managing property data, consistent with embodiments of the present disclosure. As shown in FIG. 1, system 100 may include a server 110. Server 110 may be any form of one or more computing devices for accessing data, processing data, storing data, and/or transmitting data to various other entities or computing devices. For example, this may include data associated with a property, as described above. A computing device may refer to any structure that includes at least one processor. As used herein, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

In some embodiments, server 110 may access at least one database, such as database 112. As used herein, a "database" may be construed synonymously with a "data structure" and may include any collection or arrangement of data values and relationships among them, regardless of structure. For example, a database may refer to a tangible storage device, e.g., a hard disk, used as a database, or to an intangible storage unit, e.g., an electronic database. As used herein, any data structure may constitute a database. The data contained within a data structure may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

In some embodiments, server 110 may communicate with one or more computing devices, such as computing devices 120 or 130. Computing devices 120 and 130 may include any device that may be used for performing conducting various operations associated with a data associated with a property. Accordingly, computing devices 120 or 130 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of receiving, storing, processing, or transmitting data. In some embodiments, computing devices 120 or 130 may be a virtual machine (e.g., based on AWS™, Azure™, IBM Cloud™, etc.), container instance (e.g., Docker™ container, Java™ container, Windows Server™ container, etc.), or other virtualized instance.

In some embodiments, computing device 120 may be associated with a user 122. User 122 may include any entity associated with a property. An entity may refer to any distinct or independent existence. For example, an entity be an individual, a user, a device, an account, an application, a process, a service, a facility, a piece of equipment, an organization, or any other form of object, article or person. Alternatively or additionally, an entity may be a group of two or more components (e.g., individuals, users, devices, accounts, etc.) forming a single entity. In some embodiments, user 122 may be a real estate agent. As used herein, a real estate agent may refer to or include a professional who represents parties in real estate transactions. For example, a real estate agent may include buyers, sellers, renters, landlords, or any other parties that may be involved in a real estate transaction or contract associated with a real estate property. Alternatively or additionally, user 122 may be another entity associated with a property such as a property owner, a landlord, or any other entity that may be associated with a property. User 122 may include various other entities that may capture or upload data associated with a property, such as a photographer, a staging professional, an interior designer, an architect, a landscape designer, or the like. Accordingly, user 122 may use computing device 120 to generate, capture, process, and/or transmit data associated with a property, as described throughout the present disclosure.

In some embodiments, user 122 may be associated with various other devices, such as mobile device 124 and image capture device 126. As with computing device 120, mobile device 124 may include any device that may be used for performing or conducting various operations associated with a data associated with a property. For example, mobile device 124 may be a mobile phone or other mobile device of user 122. Additionally or alternatively, mobile device 124 may include a laptop, a tablet, a wearable device (e.g., a smart watch, smart jewelry, implantable device, fitness tracker, smart clothing, head-mounted display, etc.), or any other device that may be associated with user 122. In some embodiments, mobile device 124 may include a memory device, such as a flash drive, a solid-state drive, a hard drive, or the like. In some embodiments, mobile device 124 may not necessarily be a separate device relative to computing device 120.

Image capture device 126 may be any device capable of capturing one or more images or a property, consistent with embodiments of the present disclosure. For example, image capture device 126 may be a digital camera used by user 122 to capture images of a property, which may then be uploaded to server 110. In some embodiments, image capture device 126 may include a specialized device for capturing images of buildings or other property. For example, image capture device 126 may be a rotating camera device capable of capturing and/or compiling 360-degree images of a space at various locations within a property. In some embodiments, image capture device 126 may include multiple image sensors or may include various other sensors, such as light sensors, light detection and ranging (LIDAR) sensors, radio detection and ranging (RADAR) sensors, accelerometers, global positioning system (GPS) sensors, or the like.

Computing device 130 may be similar to computing device 120 but may be remotely located relative to a property. For example, computing device 130 may be used to access data associated with a property, but may not be directly involved with the capture or upload of the data. In some embodiments, computing device 130 may be associated with a user 132, which may be a different user from user 122. In some embodiments, user 132 may use computing device 130 to communicate with computing device 120 and/or server 110, which may include accessing and interacting with data associated with the property. For example, user 132 may be a prospective buyer or renter of the property and may use computing device 130 to tour a property virtually or otherwise access data associated with the property. In some embodiments, user 132 may be referred to as an "end user" of system 100. In example embodiments where user 122 is a real estate agent, user 132 may be a client of user 122 and may access data associated with a property as part of his or her representation by user 122. Alternatively or additionally, user 122 may be a real estate agent representing a seller, and thus user 132 may not necessarily be represented by user 122. While a prospective buyer or renter is provided by way of example, user 132 may include any other entity that may be interested in viewing or accessing data associated with a property. For example, user 132 may include but is not limited to a property inspector, an appraiser, an engineer, a maintenance or repair professional, a designer, an architect, or any other entity associated with a property.

Consistent with embodiments of the present disclosure, the various components may communicate over a network 140, as shown in FIG. 1. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth®, infrared, etc.), or any other type of network for facilitating communications. In some embodiments, the communications may take place across two or more of these forms of networks and protocols. While system 100 is shown as a network-based environment, it is understood that the disclosed systems and methods may also be used in a localized system, with one or more of the components communicating directly with each other. For example, as shown in FIG. 1, computing device 120, mobile device 124, and image capture device 126 may be configured to communicate directly with each other (e.g., without an intermediate device), which may be in addition to or instead of direct communication with server 110. For example, in some embodiments image capture device 126 may transmit data directly to server 110 over network 140. Alternatively or additionally, image capture device 126 may transmit data over a shorter-range communication path to an intermediate device, such as computing device 120 or mobile device 124, which may transmit the data (either directly or after processing it further) to server 110.

Figure 2:
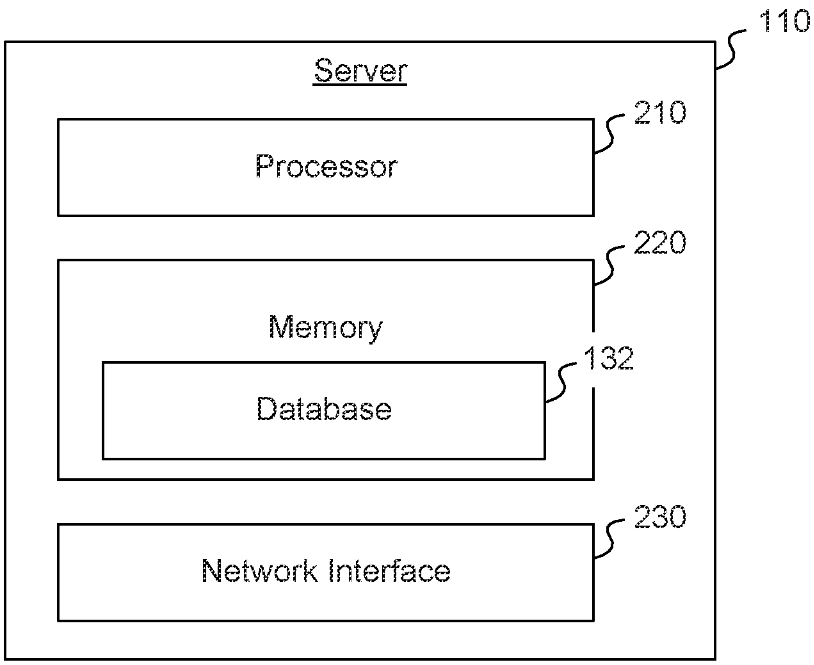
FIG. 2 is a block diagram illustrating an example server, consistent with embodiments of the present disclosure.

FIG. 2 is a block diagram illustrating an example server 110, consistent with embodiments of the present disclosure. As described above, server 110 may be a computing device and may include one or more dedicated processors and/or memories. For example, server 110 may include at least one processor, more generally referred to as processor 210, a memory (or multiple memories) 220, a network interface (or multiple network interfaces) 230, as shown in FIG. 2. As indicated above, in some embodiments, server 110 may be a rack of multiple servers. Accordingly, server 110 may include multiple instances of the example server shown in FIG. 2.

Processor 210 may take the form of, but is not limited to, a microprocessor, embedded processor, or the like, may be integrated in a system on a chip (SoC), or more take the form of any processor described earlier. Furthermore, according to some embodiments, the processor 210 may be from the family of processors manufactured by Intel®, AMD®, Qualcomm®, Apple®, NVIDIA®, or the like. Processor 210 may also be based on an ARM architecture, a mobile processor, or a graphics processing unit, etc. The disclosed embodiments are not limited to any type of processor included in server 110. In some embodiments, processor 210 may refer to multiple processors.

Memory 220 may include one or more storage devices configured to store instructions used by the processor 210 to perform functions related to the disclosed embodiments. Memory 220 may be configured to store software instructions, such as programs, that perform one or more operations when executed by the processor 210 to perform the various functions or methods described herein. The disclosed embodiments are not limited to particular software programs or devices configured to perform dedicated tasks. For example, memory 220 may store a single program, such as a user-level application, that performs the functions of the disclosed embodiments, or may include multiple software programs. Additionally, the processor 210 may in some embodiments execute one or more programs (or portions thereof) remotely located from server 110. Furthermore, the memory 220 may include one or more storage devices configured to store data for use by the programs. In some embodiments, memory 220 may include a local database 112, as described in further detail above.

Network interface 230 may include one or more network adaptors or communication devices and/or interfaces (e.g., WiFi®, Bluetooth®, RFID, NFC, RF, infrared, Ethernet, etc.) to communicate with other machines and devices, such as with other components of system 100 through network 140. For example, server 110 may use a network interface 230 to receive and transmit information associated with a property within system 100.

Figure 3A:
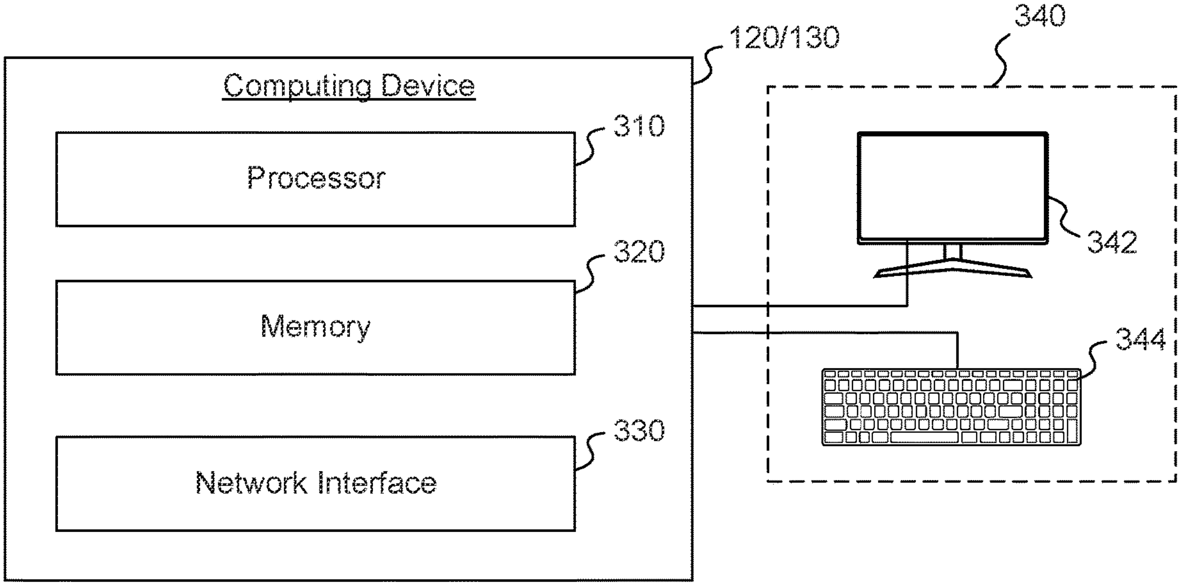
FIG. 3A is a block diagram illustrating an example computing device, consistent with embodiments of the present disclosure.

FIG. 3A is a block diagram illustrating an example computing device, consistent with embodiments of the present disclosure. Computing device 120 (or computing device 130) may include one or more dedicated processors and/or memories, similar to server 110. For example, computing device 120 may include at least one processor 310, a memory (or multiple memories) 320, a network interface (or multiple network interfaces) 330, and/or one or more input/output (I/O) devices 340, as shown in FIG. 3A. Processor 310, memory 320, and network interface 330 may be similar to processor 210, memory 220 and network interface 230, described above. Accordingly, any details, examples, or embodiments described above with respect to processor 210, memory 220 and network interface 230 may equally apply to processor 310, memory 320, and network interface 330.

For example, processor 310 may take the form of, but is not limited to, a microprocessor, embedded processor, or the like, may be integrated in a system on a chip (SoC), or more take the form of any processor described earlier. The disclosed embodiments are not limited to any type of processor included in computing device 120 and processor 310 may refer to multiple processors. Memory 320 may include one or more storage devices configured to store instructions used by the processor 310 to perform functions related to the disclosed embodiments. Memory 320 may be configured to store software instructions, such as programs, that perform one or more operations when executed by the processor 310 to perform the various functions or methods described herein. Network interface 330 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) through network 140.

I/O devices 340 may include one or more interface devices for interfacing with a user of server 110. For example, I/O devices 340 may include a display 342 configured to display various information to a user, such as user 122. In some embodiments, display 342 may be configured to present one or more graphical user interfaces to a user and may receive information through the graphical user interface. In some embodiments, I/O devices 340 may include a keyboard 344 or other device through which a user may input information. I/O devices 340 may include various other forms of devices, including but not limited to lights or other indicators, a touchscreen, a keypad, a mouse, a trackball, a touch pad, a stylus, buttons, switches, dials, motion sensors, microphones, video capturing devices, or any other user interface device, configured to allow a user to interact with computing device 120. Although I/O devices 340 are illustrated as external or separate components from computing device 120 by way of example, it is to be understood that computing device 120 may be defined to include I/O devices 340. In some embodiments, I/O devices 340 may be integral to computing device 120. For example, in embodiments where computing device 120 includes a mobile device such as a phone or tablet computer, I/O devices 340 may be integral to computing device 120.

Some disclosed embodiments may include presenting various user interfaces to receive information from a user. For example, this may include displaying one or more graphical user interfaces on display 342 and receiving a user input through keyboard 344 or various other forms of I/O devices. Consistent with the present disclosure, the user inputs may be used to define or provide various information, including but not limited to image data, virtual tour data, landing pages, or various other forms of information described herein.

Figure 3B:
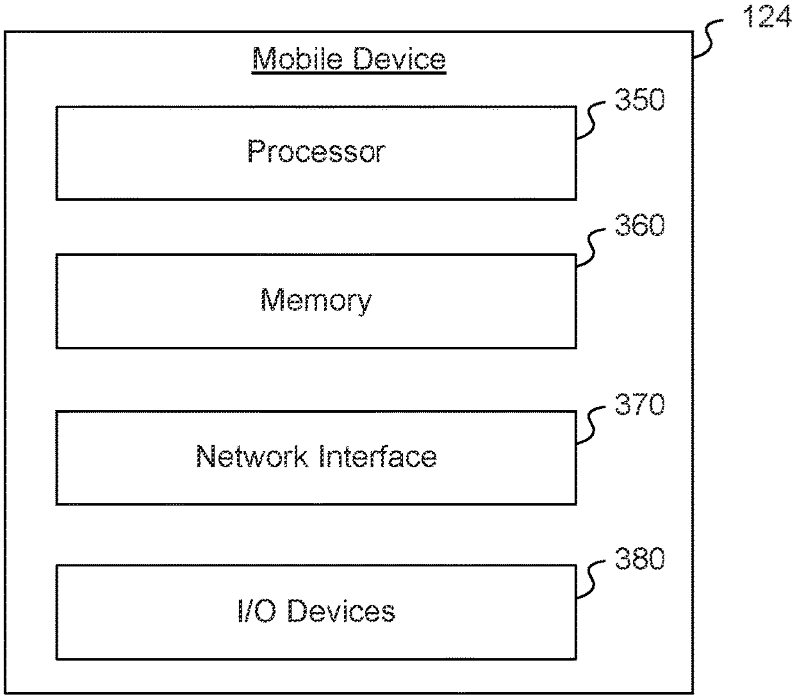
FIG. 3B is a block diagram illustrating an example mobile device, consistent with embodiments of the present disclosure.

FIG. 3B is a block diagram illustrating an example mobile device 124, consistent with embodiments of the present disclosure. Mobile device 124 may include one or more dedicated processors and/or memories, similar to server computing device 120 (or computing device 130). For example, mobile device 124 may include at least one processor 350, a memory (or multiple memories) 360, a network interface (or multiple network interfaces) 370, and/or one or more input/output (I/O) devices 370, as shown in FIG. 3B. Processor 350, memory 360, network interface 370, and I/O devices 380 may be similar to processor 310, memory 320, network interface 330, and I/O devices 340 described above. Accordingly, any details, examples, or embodiments described above with respect to processor 310, memory 320, network interface 330, and I/O devices 340 may equally apply to processor 350, memory 360, network interface 370, and I/O devices 380.

For example, processor 350 may take the form of, but is not limited to, a microprocessor, embedded processor, or the like, may be integrated in a system on a chip (SoC), or more take the form of any processor described earlier. Memory 360 may include one or more storage devices configured to store instructions used by the processor 350 to perform functions related to the disclosed embodiments. Memory 360 may be configured to store software instructions, such as programs, that perform one or more operations when executed by the processor 350 to perform the various functions or methods described herein. Network interface 370 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) either directly or through network 140. I/O devices 380 may include one or more interface devices for interfacing with a user of server 110. For example, I/O devices 380 may include a display configured to display various information to a user, such as user 122. I/O devices 380 may include various other forms of devices, including but not limited to lights or other indicators, a touchscreen, a keypad, a mouse, a trackball, a touch pad, a stylus, buttons, switches, dials, motion sensors, microphones, video capturing devices, or any other user interface device, configured to allow a user to interact with computing device 120.

Figure 4:
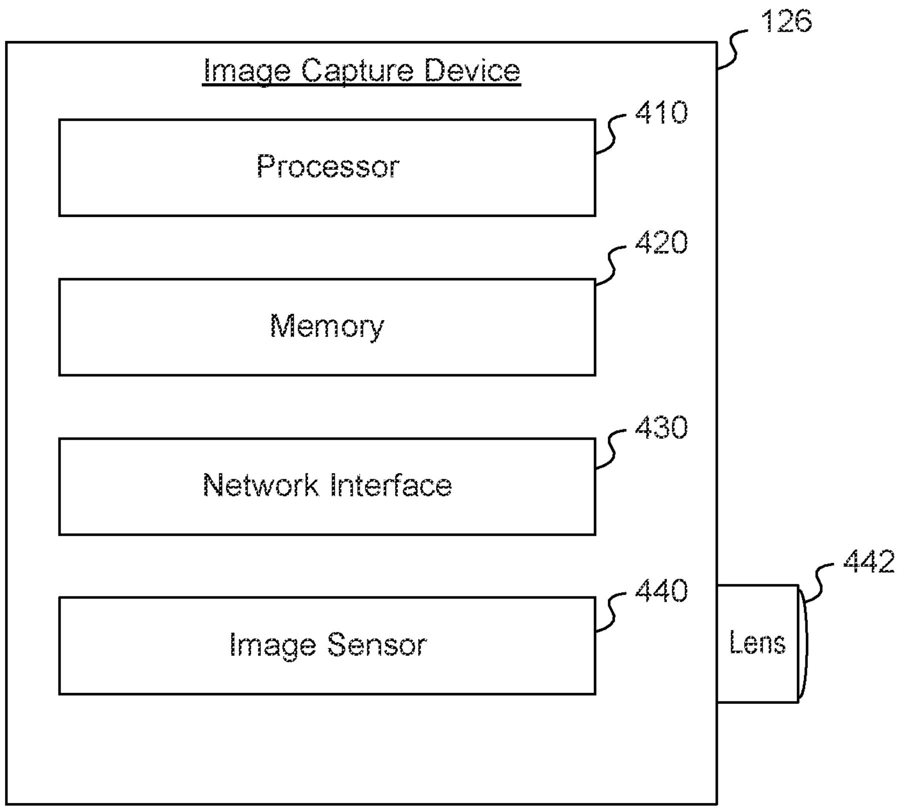
FIG. 4 is a block diagram illustrating an example image capture device, consistent with embodiments of the present disclosure.

FIG. 4 is a block diagram illustrating an example image capture device 126, consistent with embodiments of the present disclosure. Image capture device 126 may include one or more dedicated processors and/or memories, similar to computing devices 120 or 130. For example, image capture device 126 may include at least one processor 410, a memory (or multiple memories) 420, a network interface (or multiple network interfaces) 430, and/or one or more input/output (I/O) devices 340, as shown in FIG. 3A. Processor 410, memory 420, and network interface 430 may be similar to processor 310, memory 320 and network interface 330, described above. Accordingly, any details, examples, or embodiments described above with respect to processor 310, memory 320 and network interface 330 may equally apply to processor 410, memory 420, and network interface 430. For example, processor 410 may take the form of, but is not limited to, a microprocessor, embedded processor, or the like, may be integrated in a system on a chip (SoC), or more take the form of any processor described earlier.

Memory 420 may include one or more storage devices configured to store instructions used by the processor 410 to perform functions related to the disclosed embodiments. Memory 420 may be configured to store software instructions, such as programs, that perform one or more operations when executed by the processor 410 to perform the various functions or methods described herein. Network interface 430 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) either directly or through network 140. In some embodiments, image capture device 126 may further include various I/O devices, similar to I/O devices 340 or 380 described above.

As shown in FIG. 4, image capture device 126 may include at least one image sensor 440 associated with at least one lens 442 for capturing image data in an associated field of view. In some configurations, image capture device 126 may include a plurality of image sensors 440 associated with a plurality of lenses 442. In other configurations, image sensor 440 may be part of a camera included in image capture device 126. Consistent with the present disclosure, image capture device 126 may include digital components that collect data from image sensor 440, transform it into an image, and store the image on a memory device 420 and/or transmit the image using network interface 430. In some embodiments, image capture device 126 may be configured to capture images from multiple directions, which may be compiled to generate a panoramic or 360-degree image. In one embodiment, image capture device 126 may be split into at least two housings such that image sensor 440 and lens 442 may be rotatable relative to one or more other components, which may be located in a separate housing. An example of this type of capturing device is described below with reference to FIG. 5. Alternatively or additionally, image capture device 126 may include multiple image sensors 440 and/or lenses 442 which may simultaneously (or near-simultaneously) capture images in multiple directions, which may be compiled into a composite image. The processing of multiple images to form a composite image may occur locally (e.g., using processor 410), or may be performed fully or at least partially by another device such as computing device 120, mobile device 124, or server 110.

Figure 5:
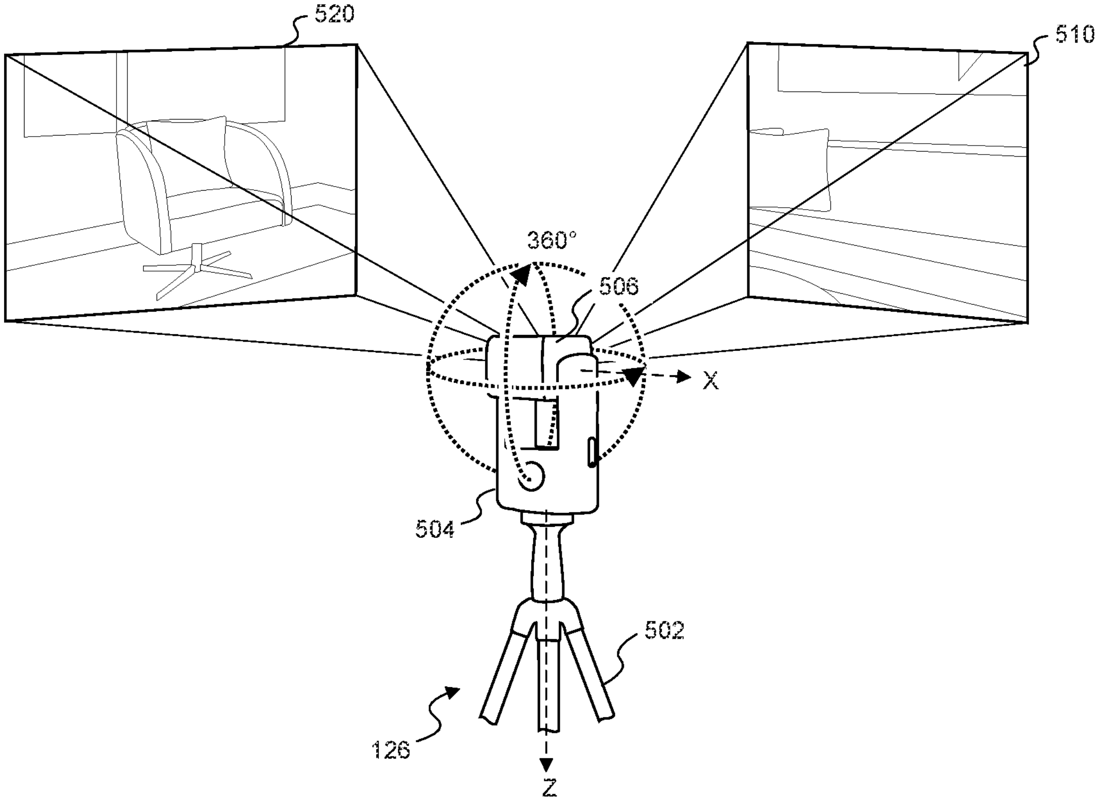
FIG. 5 illustrates an example implementation of an image capture device for capturing composite images within a space, consistent with embodiments of the present disclosure

FIG. 5 illustrates an example implementation of image capture device 126 for capturing composite images within a space, consistent with embodiments of the present disclosure. For example, image capture device 126 may be configured to capture a first image 510 in a first direction relative to image capture device 126 and a second image 520 in a second direction relative to image capture device 126. In some embodiments, image capture device 126 may capture images from different directions using a movable image sensor 440 and lens 442, as described above. For example, image capture device 126 may include a base component 502 and one or more rotatable components 504 and 506. Base component 502 may be any component configured to be at least temporarily fixed at a position within a property. For example, base component may include a tripod or other components to provide stability, as indicated in FIG. 5. Image capture device 126 may include at least one rotatable component 504, which may rotate around a vertical axis Z, as shown. This may enable image sensor 440 and lens 442 to similarly rotate around vertical axis Z, enabling image capture device 126 to capture images in 360 degrees relative to base component 502.

In some embodiments, lens 442 may be configured to allow image capture device 126 to capture sufficient image data based on the rotation of rotatable component 504 relative to base component 502. For example, lens 442 may have a wide field of view such that images 510 and 520 capture a sufficient portion of the surroundings of image sensor 126 without rotation of image sensor 440 and lens 442 in any additional directions. Alternatively or additionally, image capture device 126 may include an additional rotatable component 506 housing image sensor 440 and lens 442. Additional rotatable component 506 may be rotatable about a horizontal axis X to provide an additional degree of freedom for image capture device 126. Accordingly, based on the rotation of rotatable components 504 and 502 relative to each other and to base component 502, images may be captured in all directions relative to image capture device 126. In some embodiments, rotatable components 504 and 506 may be manually rotated by a user, such as user 122 to capture the surroundings of image capture device 126. For example, user 122 may manually rotate image sensor 440 and lens 442 to different orientations and capture images (e.g., image 510 and image 520) at various orientations. Alternatively or additionally, the rotation of image sensor 440 and lens 442 and/or capturing of images may be at least partially automated. For example, image capture device 126 may include one or more motors to automatically rotate rotatable components 504 and 506 to capture a desired range of the surroundings of image capture device 126. In some embodiments, user 122 may move base component 502 (and the rest of image capture device 126) to various positions within a property and image capture device 126 may automatically capture images at the specified position to generate composite images.

Images 510 and 520 (along with various other images captured in other directions relative to image capture device 126) may be combined to form one or more composite images representing the surroundings of image capture device 126. In some embodiments, a composite image may be generated by matching corresponding features in overlapping images to align the images. Accordingly, generating a composite image may include application of various feature or object detection algorithms to images 510 and 520. Alternatively or additionally, various images may be aligned using known orientations relative to image capture device 126 that images 510 and 520 were captured from. For example, based on the orientation of rotatable components 504 and 506, an orientation of images 510 and 520 may be determined, which may be used to align the images.

Figure 6:
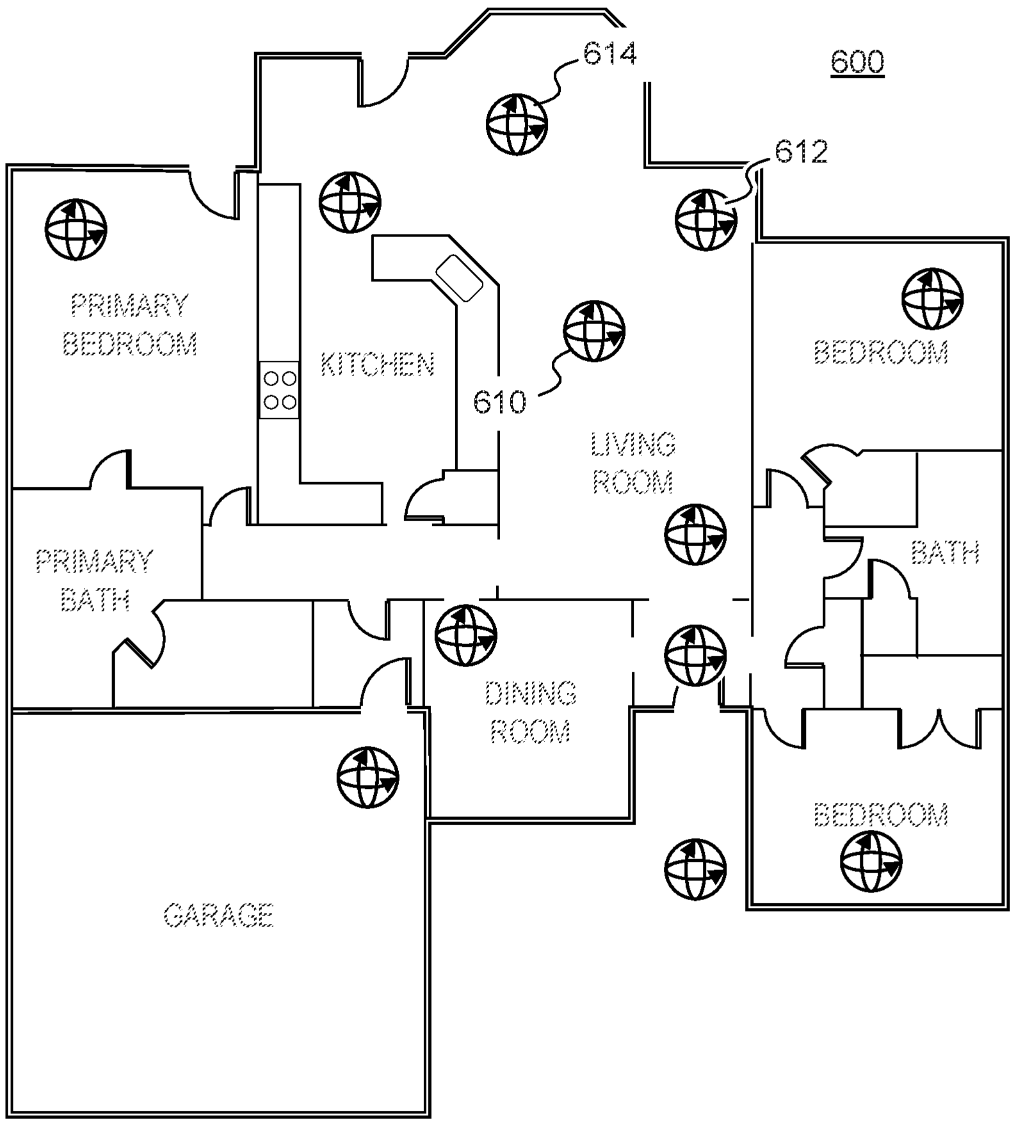
FIG. 6 illustrates an example floorplan of a property, consistent with embodiments of the present disclosure.

FIG. 6 illustrates an example floorplan of a property 600, consistent with embodiments of the present disclosure. In this example, property 600 may be a single-family dwelling such as a house. As described above, image capture device 126 may be used to capture data at various locations within property 600. In some embodiments, this may include capturing composite images representing a view of property 600 across multiple orientations. For example, image capture device 126 may be used to capture a composite image at location 610 which may include a 360 degree view of the living room of property 600. Another composite image showing at least a portion of the living room may be captured at location 612. In some embodiments, the positions of the captured images may be input (or confirmed) by a user, such as user 122. For example, user 122 may select an approximate image capture location within a floor plan when capturing a composite image using image capture device 126. Alternatively or additionally, determining or estimating the positions of locations 610 and 612 may be at least partially automated. For example, various image analysis algorithms may be used to identify features in a composite image captured at location 610, which may be compared to corresponding features appearing in a composite image captured at location 612. Accordingly, a relative position (e.g., distance, elevation, orientation, etc.) between locations 610 and 612 may be determined. This may be repeated across several other locations (e.g., location 614) to develop a map of property 600.

In some embodiments, various camera tracking techniques may be used to determine positions of locations 610, 612, and 614. For example, this may include various simultaneous localization and mapping (SLAM) techniques for camera tracking. This may include the use of various forms of sensor data, such as LIDAR sensors, inertial measurement unit (IMU) sensors, image sensors, and the like. Based on one or more of these types of sensor data, a relative position within a property may be determined. As another example, a trained machine learning model may be used to determine positions of locations 610, 612, and 614. For example, a training set of data may be input into a machine learning model, which may include known positions of composite images captured in different properties. Accordingly, a model may be trained to predict or determine positions for other sets of captured composite images. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

The composite image data and other data associated with property 600 (which may be referred to as "virtual tour data") may be uploaded to server 110. Alternatively or additionally, raw or semi-processed data may be uploaded to server 110 and the composite image data and other data may be generated by server 110. As described above, this data may be accessed and/or viewed by user 132 using computing device 130. In some embodiments, the data may be presented in the form of a virtual tour or virtual walkthrough enabling a user to navigate a simulated environment of property 600. For example, computing device 130 may display a user interface allowing user 132 to navigate between the composite images captured at locations 610, 612, and 614.

Figure 7:
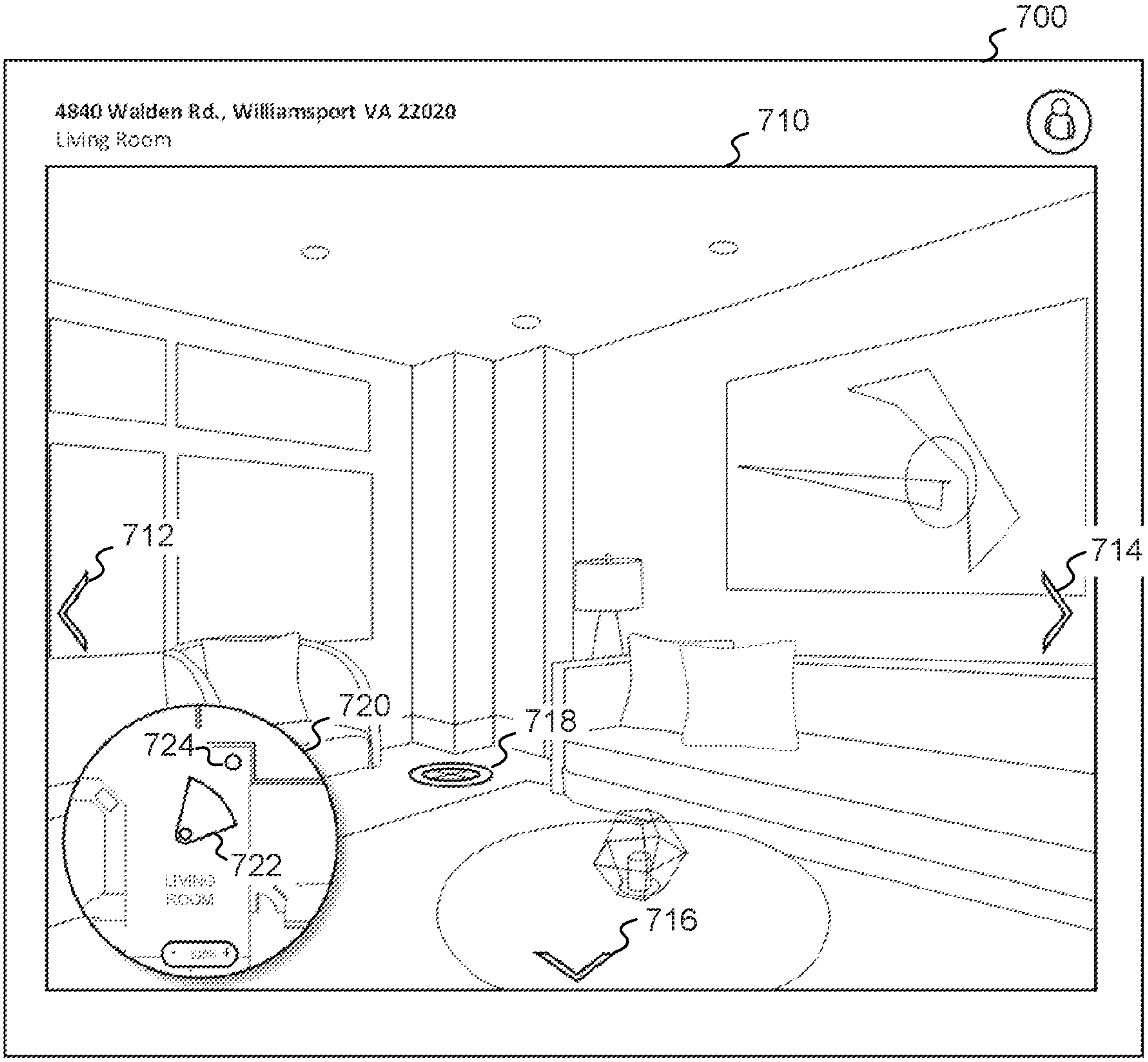
FIG. 7 illustrates an example user interface for providing a virtual tour of a property consistent with embodiments of the present disclosure.

FIG. 7 illustrates an example user interface 700 for providing a virtual tour of a property consistent with embodiments of the present disclosure. User interface 700 may be presented via a display of a user device to allow a user to view and interact with virtual tour data associated with a property. For example, user interface 700 may be presented on a display 342 of computing device 120 or 130 to allow user 122 or user 132 to view virtual tour data captured within property 600. User interface 700 may include a viewing pane 710 configured to display images of property 600. For example, viewing pane 710 may display at least a portion of a composite image captured at various locations within property 600. In the example shown in FIG. 7, viewing pane 710 may display a portion of a composite image captured at location 610, as described above.

User interface 700 may include various navigation elements 712, 714, 716, and 718, which may allow a user to update the view shown in viewing pane 710. Accordingly, user interface 700 may allow the user to navigate virtually through property 600 to simulate an actual walkthrough of property 600. For example, navigation elements 712 and 714 may allow the user to pan left or right within a composite image captured at location 610. Navigation element 716 may allow a user to move to a location behind the view currently shown in viewing pane 710. Similarly, user interface 700 may include navigation elements for moving forward to locations ahead of the current view. In some embodiments, user interface 700 may overlay navigation element 718 on an image, which may represent the position of another location the user may navigate to. For example, navigation element may represent location 612 as shown in FIG. 6. Accordingly, selection of navigation element 718 may cause viewing pane 710 to show a composite image captured at location 612. In some embodiments, user interface 700 may include a zoom element, allowing a user to zoom in or out of the image shown in viewing pane 710.

In some embodiments, user interface 700 may further include a map element 720 showing a birds-eye view of property 600. Map element 720 may include a current view element 722, which may show an approximate location of current view displayed in viewing pane 710 (including position, orientation, or both). In some embodiments, map element 720 may also display navigation elements, such as navigation element 724 for moving to different locations within the property. For example, selecting navigation element 724 may cause viewing pane 710 to display a composite image captured at location 612, similar to navigation element 718. In some embodiments, user interface 700 may include a toggle button or other option to hide (or display) map element 720.

While various navigation elements are shown in FIG. 7 by way of example, one skilled in the art would recognize various other ways a user may navigate virtually through a property. For example, user interface 700 may allow a user to pan around at a particular location by clicking and dragging viewing pane 710. As another example, a user may navigate through keyboard 344 and/or another input device (e.g., a mouse, joystick, etc.). For example, the user may look around within a composite image by moving a mouse and may navigate between various locations using the arrow keys or other keys of keyboard 344. In some embodiments, viewing pane 710 may be presented within a virtual reality headset or other wearable device. Accordingly, user 132 may navigate at least partially by moving his or her head in different directions.

While various example user interfaces are provided throughout the present disclosure, it is to be understood that the various elements, layouts, and information presented therein are shown by way of example. One skilled in the art would recognize that various other forms of user interfaces may be implemented, depending on the particular application or based on individual preferences. For example, while user interface 700 is presented as a viewing pane with navigational elements overlayed on the image, one skilled in the art would recognize that similar information may be acquired through various other user interface layouts and controls. Accordingly, any of the various user interfaces presented herein may include various forms of buttons, text input fields, radio buttons, checkboxes, dropdown lists or menus, links, breadcrumbs, timelines, tabs, links, tree panes, menus, accordion controls, icons, tooltips, alerts, pop-ups, touchscreen interfaces, or any other form of element for inputting and/or displaying information.

In some embodiments, the various techniques described herein may include application of one or more trained machine learning algorithms. These machine learning algorithms (also referred to as machine learning models in the present disclosure) may be trained using training examples to perform particular functions (including both supervised and/or unsupervised), as described more specifically in the various examples herein. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. In some examples, the training examples may include example inputs together with the desired outputs corresponding to the example inputs.

Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters. For example, the hyper parameters may be set automatically by a process external to the machine learning algorithm (such as a hyper parameter search algorithm), and the parameters of the machine learning algorithm may be set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures. The input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short-term memory artificial neural networks, and so forth. In some examples, an artificial neural network may be configured by a user. For example, a structure of the artificial neural network, a type of an artificial neuron of the artificial neural network, a parameter of the artificial neural network (such as a parameter of an artificial neuron of the artificial neural network), and so forth may be selected by a user. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps and modules described herein) may include analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the following are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth.

In some embodiments, analyzing image data (for example, by the methods, steps and modules described herein) may include analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

Autoplay Sessions for Virtual Tours

As described above, the disclosed embodiments may allow a user, such as user 132 to engage in a virtual tour of a property. For example, user 132 may navigate virtually through a property by viewing images captured from within the property at various locations. An example graphical user interface for a virtual tour is illustrated in FIG. 7 and described in further detail above. In some embodiments, the disclosed systems and methods may allow for an autoplay session for a virtual tour. As used herein, an autoplay session may refer to a virtual tour that progresses automatically without requiring navigational inputs from a user. Accordingly, an autoplay of the virtual tour may be a predefined series of navigation steps through a virtual environment. For example, the navigation steps may include transitioning through a series of virtual locations or "waypoints," which may be associated with physical locations in a property. The waypoints may be associated with captured images such that transitioning through the waypoints simulates a movement through the property. The navigation steps may further include panning around the environment at a particular waypoint, zooming in or out of an image, or various other actions that may change the view of a property presented to a user.

Figure 8:
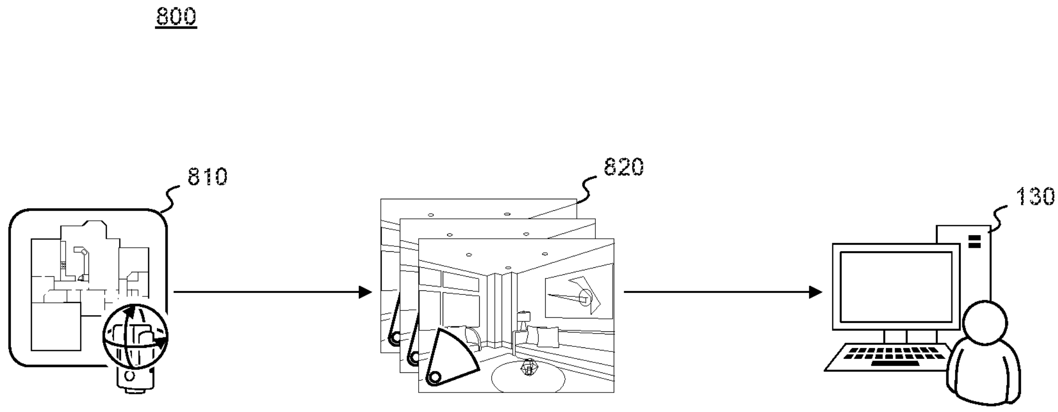
FIG. 8 illustrates an example process for generating autoplay session data, consistent with embodiments of the present disclosure.

In some embodiments, the autoplay may be represented as autoplay session data which may include instructions for displaying a series of views within a property. This autoplay session data may be generated automatically based on virtual tour data captured within a property. FIG. 8 illustrates an example process 800 for generating autoplay session data, consistent with embodiments of the present disclosure. Process 800 may include receiving or accessing virtual tour data 810, generating autopay session data 820 based on virtual tour data 810, and making autopay session data 820 available for display to a user. For example, process 800 may include causing autopay session data 820 to be displayed via a user interface on computing device 130, as shown. In some embodiments, process 800 may be performed by one or more processing devices of a server, such as processor 210. For example, user 122 may capture virtual tour data 810 within a property using image capture device 126. Virtual tour data 810 may then be uploaded to server 110 via network 140. Server 110 may then analyze virtual tour data 810 to generate autoplay session data 820, as described in further detail below. Alternatively or additionally, some or all of process 800 may be performed by another device in system 100, such as computing device 120, computing device 130, mobile device 124, or image capture device 126 (or any combination thereof).

As described above, the virtual tour data 810 may include one or more images captured at various physical locations within a property. For example, this may include image data captured at locations 610, 612 and 614 using image capture device 126, as described above. In some embodiments, the image data may include composite images such that the images cover a wider field of view than any individual image alone. For example, virtual tour data 810 may include 360 degree images or other forms of panoramic image data captured at each waypoint location. In some embodiments, virtual tour data 810 may include additional information, such as location data associated with the images, timestamp information, information about the property associated with virtual tour data 810 (e.g., an address, a listing ID, a property ID, an agent associated with the property, etc.), or various other forms of data. Virtual tour data 810 may not necessarily have been captured in a single image capture session. In some embodiments, virtual tour data 810 may have been captured over the course of multiple days, weeks, months, or years, depending on the application. Accordingly, server 110 (or another device of system 100) may store data associated with one or more properties (e.g., in database 112), which may be supplemented as additional data is captured. In some embodiments, system 100 may allow user 122 or another user to manage data associated with a property. For example, this may include adding or removing image capture sessions, adding or removing data within an image capture session, or the like.

In some embodiments, virtual tour data 810 may be processed further prior to generating autoplay session data 820. For example, this processing may include adjusting image properties (e.g., brightness, contrast, color, resolution, etc.), combining or merging image data (which may include generating composite images), warping image data, upscaling or downscaling images, compressing data, or the like. This processing may occur at server 110, computing device 120, mobile device 124, or image capture device 126 (or any combination thereof).

As indicated above autoplay session data 820 may indicate a series of views within a property. Autoplay session data 820 may be represented in any suitable formats to allow a user to be presented with the series of views. For example, autoplay session data 820 may be stored as a text string, a list, a table structured format (e.g., a JSON file, etc.), a proprietary format, or any other suitable format. In some embodiments, autoplay session data 820 may be a set of instructions for displaying views from within virtual tour data 810. Accordingly, a device displaying an autoplay of a virtual tour may access both virtual tour data 810 and autoplay session data 820. Alternatively or additionally, autoplay session data 820 may include image data from virtual tour data 810 such that autoplay session data 820 alone may be sufficient for presenting an autoplay of a virtual tour. In some embodiments, process 800 may include generating a video file or other file capturing the autoplay of the virtual tour such that the autoplay can be viewed without a dedicated viewing interface.

Figure 9:
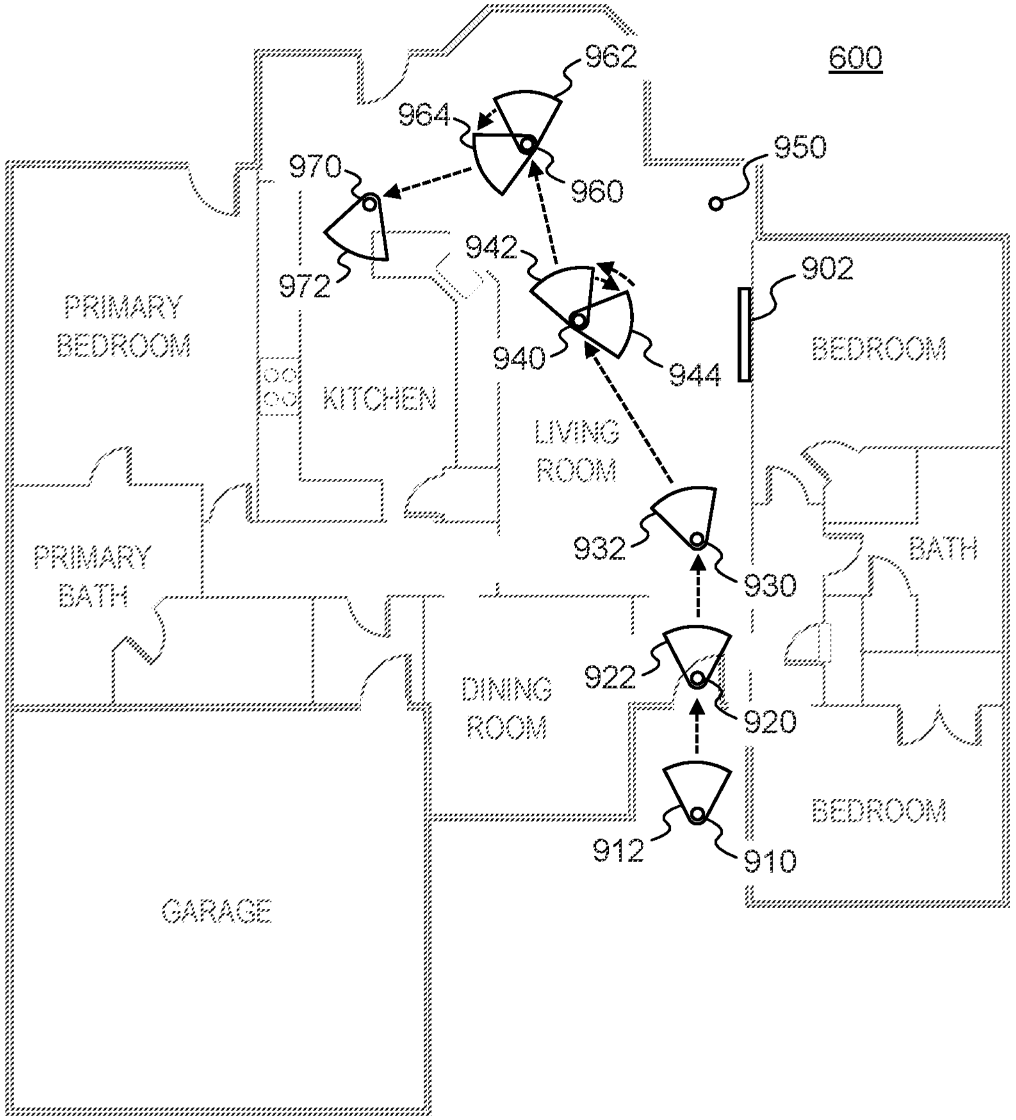
FIG. 9 illustrates an example portion of an autoplay of a virtual tour through property, consistent with embodiments of the present disclosure.

Autoplay session data 820 may define a path through various waypoints associated with a property, as well as specific views to be displayed at each waypoint location. FIG. 9 illustrates an example portion of an autoplay of a virtual tour through property 600, consistent with embodiments of the present disclosure. In this example, autoplay session data 820 may define an autoplay that progresses through waypoint locations 910, 920, 930, 940, 960, and 970, as shown. The waypoint locations may correspond to locations in property 600 where image data is available. For example, waypoint locations 940, 950, and 960 may correspond to locations 610, 612, and 614, as described above. Accordingly, autoplay session data 820 may define a path through a property along a series of waypoint locations.

As shown in FIG. 9, autoplay session data 820 may also include specific views to be displayed at each waypoint location. For example, this may include views 912, 922, 932, 942, 944, 962, 964, and 972. These views may define a specific image or portion of an image to display at each waypoint location. For example, in some embodiments, a group of images may be captured at each waypoint location and the views may specify which image or images to display. Alternatively or additionally, a panoramic image may be generated or captured for each waypoint location, and the views may specify which portion of a panoramic image to display. The views may define a horizontal orientation within the property, a vertical orientation, a zoom level, or any other aspects defining which image or portion of an image to display. In some embodiments, autoplay session data 820 may not necessarily include views at all possible waypoint locations. For example, autoplay session data 820 may not include displaying any views associated with waypoint location 950, as shown in FIG. 9. This may be based on a determination that the living room is adequately covered by views 930, 942, and 944, a location of waypoint 950, an assessed image quality for images at waypoint location 950, or the like. Various other rules defining how autoplay session data may be developed are described in further detail below.

In some embodiments, multiple views may be displayed at each waypoint location. For example, autoplay session data 820 may define two views 942 and 944 at waypoint location 940. In some embodiments, autoplay session data 820 may further define the order in which views at each waypoint location are displayed. For example, autoplay session data 820 may include displaying view 942 at waypoint 940, displaying view 962 at waypoint 960, panning across an image at waypoint 960 over to view 964, and then displaying view 972 at waypoint 970. Autoplay session data 820 may also define a duration to display images from each waypoint, a duration to display each view, a speed for panning between views at a particular waypoint location, a speed for zooming in or out of an image, a speed for "moving" or transitioning between waypoint locations, or any other aspect of an autoplay session. Accordingly, autoplay session data 820 may fully define an autoplay of a virtual tour to be displayed to a user. It is to be understood that the autoplay session shown in FIG. 9 is provided by way of example, and various other forms of autoplays may be generated, including autoplays with various degrees of complexity. For example, while one or two viewpoints are generally shown at each waypoint location in FIG. 9 for purposes of illustration, it is to be understood that any number of views and/or waypoint locations may be included. For example, autoplay session data 820 may be defined to pan across a range of views at each waypoint location, return to specific views that may be of interest, zoom in or out in various views, or the like.

In some embodiments, the autoplay of the virtual tour may be generated according to one or more rules to improve the experience for a user. The rules may define how the autoplay is generated, including which areas of a property should be included, how the path through the property is specified, which features of a property are presented to the user, a speed at which the user moves through the property, a duration particular features or rooms are displayed, or the like. Accordingly, server 110 may store a set of rules (which may be in the form of software, etc.) to use for generating autoplay session data 820. In some embodiments, the autoplay may be generated to cover an entirety of a property. This may ensure a user is shown the entire property during the autoplay session. Alternatively or additionally, autoplay session data 820 may be generated to avoid or skip areas that may not be of interest. For example, the autoplay may avoid showing utility rooms, pantries, storage closets, or other areas that may not be of interest to a user.

In some embodiments, the autoplay may be generated to vary how long a user views certain rooms or features of a property. For example, the autoplay of the virtual tour may be configured to select views that are likely to be the most interesting to a user and avoid (or at least limit time spent showing) views that may be of lower interest. Accordingly, the durations of views 912, 922, 932, 942, 944, 962, 964, and 972 may be different from each other and may be specified based on the locations within a property, features shown in the view, or the like. For example, a user may be less interested in a hallway or entryway and may move quickly through those areas but may spend more time displaying kitchens, bedrooms, or other areas that may be of greater interest. Accordingly, in the example shown in FIG. 9, the duration of view 922 in the entryway of property 600 may be shorter than the duration of view 972, which may include a kitchen of property 600. Similarly, the angle of view may be determined based on the position of one or more waypoints relative to the layout of the property. For example, if a waypoint is located in a corner of a room, the system may limit or avoid showing a wall or a corner of the room and increase the focus on angles showing a greater portion of the room. Similarly, some rooms may be of higher interest than others. For example, a primary bedroom may be classified as more interesting than a secondary bedroom, a closet, or other rooms.

In some embodiments, the system may automatically detect and classify certain features within the images. Different classifications of features may be associated with greater importance or interest to users and may therefore be featured more prominently during the autoplay session (e.g., by panning to view the feature, pausing on the feature, zooming in on the feature, spending a greater amount of time showing the feature, etc.). For example, the system may automatically detect entry doors (e.g., front doors, back doors, etc.), which may be assigned a greater level of interest than interior doors. Other examples of features of interest may include fireplaces, storage spaces, countertops, appliances, showers, light fixtures, architectural features, furniture, artwork, or any other objects that may be of interest to a user. Referring to FIG. 9, property 600 may include a feature of interest 902, which in this example may be a painting. Autoplay session data 820 may include a view 944 to highlight or present feature of interest 902 at least briefly. In some embodiments, server 110 may store a data structure indicating feature types that are classified as being of interest and therefore should be featured within autoplay session data 820. In some embodiments, this may include multiple tiers or categories of features, which may be treated differently. For example, a hot tub may be ranked higher than a built-in bookshelf and thus may be featured longer, although both may be featured in autoplay session data 820. In some embodiments, the hierarchy or ranking of features may be at least partially defined based on user preferences, as described further below.

In order to identify and classify various features within a property, the system may use one or more image processing algorithms to detect features within the images. For example, this may include scale-invariant feature transform (SIFT), histogram of oriented gradients (HOG) features, or other image analysis techniques as described herein. Alternatively or additionally, system 100 may use a trained machine learning algorithm for detecting features within an image. For example, a training algorithm, such as convolutional neural network (CNN) may receive training data in the form of image data with labels indicating features of interest along with classifications of the features (e.g., “fireplace,” “stove,” etc.). The training data may be labeled such that the features are identified in the image data. For example, the images may be labeled with polygonal lines or other indications of the features. As a result, a model may be trained to generate similar classifications of features in images included in virtual tour data. In some embodiments, this may also include a reward function approach that rewards correct selections. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

In some embodiments, the system may also classify rooms based on image analysis, which may be used in generating the autoplay of the virtual tour. Accordingly, each waypoint location or view may be labeled with an associated room classification. In some embodiments, the room classification may be based on features detected in the room. For example, if an image includes features such as a range, a dishwasher, a refrigerator, or similar features, the system may determine the image depicts a kitchen. Accordingly, server 110 may store a database or other data structure associating feature classifications with one or more room classifications. Alternatively or additionally, room classification may be performed separately from detecting features. For example, a separate machine learning model may be trained to classify rooms based on image data.

The path through a property may also be defined at least partially based on the classification of rooms associated with each waypoint or the features visible from each waypoint. For example, a general preference may be defined to begin at a front or main entrance to a property. Accordingly, the system may analyze images within virtual tour data 810 to identify a front entrance using the various techniques described above. In the example shown in FIG. 9, this may include identifying a front door visible within images associated with waypoint 910. Accordingly, waypoint 910 (and view 912) may be selected as the beginning of the autoplay session defined by autoplay session data 820. In some embodiments, a rule or preference may be defined to prioritize various room types within an autoplay session. For example, a rule may be defined to show more public living spaces (e.g., a kitchen, living room, family room, dining room, etc.) first, and then proceed to more private living spaces (e.g., a study, bathroom, basement, bedroom, etc.). In some embodiments, the hierarchy or ranking of rooms may be at least partially defined based on user preferences, as described further below. As another example, a rule may be defined to take the shortest path through a property, or various other rules that may affect the path through various waypoints. The path may also be generated based on walls or other features detected in the images. For example, the path may be generated to avoid paths that would travel through walls, travel through furniture or other obstacles, jump between floors, result in changes in elevation, or the like.

Figure 10A:
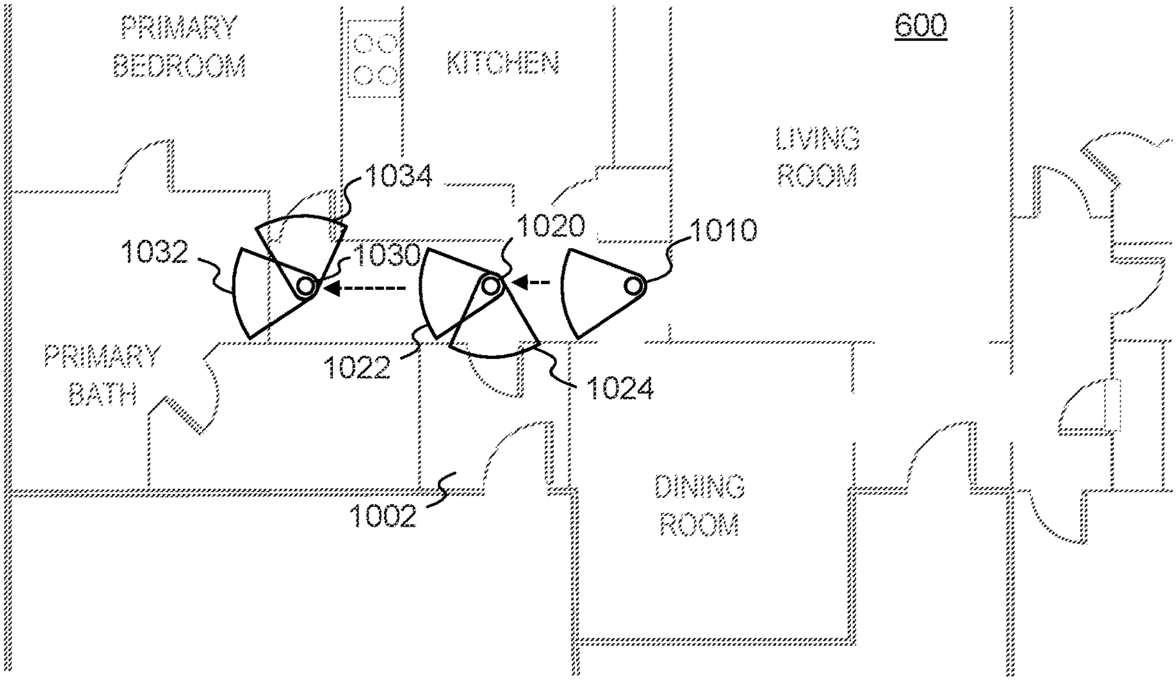
FIG. 10A illustrates an example portion of an autoplay of a virtual tour through property, consistent with embodiments of the present disclosure.

According to some embodiments, one or more views may be selected or defined to maximize coverage of a property. In some embodiments, this may be based on the location of waypoints within the property. For example, if no waypoint is included in a room (e.g., a closet, bathroom, etc.), the autoplay may be generated to stop and turn towards the room missing the waypoint as the virtual tour proceeds past the room as this may be the only opportunity for the user to view the room. FIG. 10A illustrates an example portion of an autoplay session that may be generated, consistent with embodiments of the present disclosure. In this example, the autoplay may include a transition between waypoints 1010, 1020, and 1030, as shown. Property 600 may include a room 1002 (which may be a laundry room or mudroom) that may not include a waypoint location. Accordingly, autoplay session data 820 may be generated to include a view 1024, which may look into room 1002 to ensure that a user can visualize room 1002 during an autoplay of a virtual tour. The autoplay may then return to view 1022 and proceed to waypoint location 1030.

In some embodiments of the present disclosure, one or more rules or guidelines may be defined to improve the user's spatial awareness during the tour. For example, this may include avoiding changing the viewing angle when the tour progresses to a new waypoint. For example, when moving to a waypoint against a wall, the autoplay session may be configured to show the wall initially and then pan away from the wall to show more interesting features. Referring to FIG. 10A, as the autoplay progresses to waypoint 1030, a view 1032 may be displayed, which may mostly include a wall at the end of a hallway. Although this view may normally be deemed of lesser interest to a user, including this view at least briefly may provide continuity from view 1022, which may prevent or reduce the likelihood of the user being disoriented as compared to transitioning directly to view 1034. Autoplay session data 820 may then pan to view 1034 and continue into the primary bedroom.

Figure 10B:
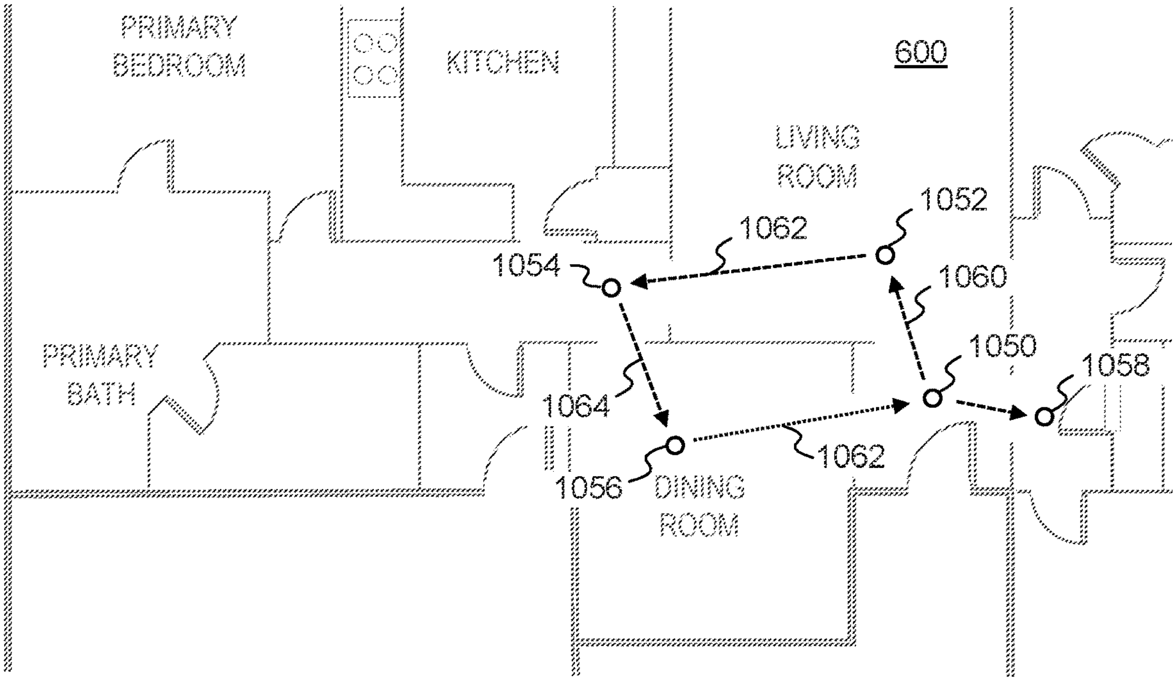
FIG. 10B illustrates an example path that may be generated as part of an autoplay, consistent with embodiments of the present disclosure.

Another example for improving a spatial awareness of a user may include a rule or guideline to avoid traveling in a loop within the property, which may be confusing to a user. FIG. 10B illustrates an example path that may be generated, consistent with embodiments of the present disclosure. In this example, an autoplay session may be generated to move along waypoints 1050, 1052, 1054, and 1056 along paths 1060, 1062, and 1064, and then proceed to waypoint 1058. If a user is unfamiliar with a property, it may be disorienting to move along path 1062 to waypoint 1050 and then to waypoint 1058. For example, it may be unclear whether waypoint 1050 has already been included in the autoplay session, or whether it is a new area of property 600. Accordingly, rather than progressing along path 1062, a rule or preference may be defined to turn around and travel back along paths 1064, 1062, and 1060, which may be clearer to a user. In some embodiments, this may depend on the time it would take or the number of waypoints that would be included in returning along the previous path. For example, while the loop shown in FIG. 10B is relatively short, other properties may cause larger loops to be generated, sometimes spanning across multiple floors. Accordingly, the shorter route of completing the loop may be preferable. In some embodiments, this may include calculating weights for each potential route option, where the weights consider the risk of potential disorientation as well as the added time for returning along a previous path. Similarly, a preference may be defined to enter new areas of a property by traveling through indoor spaces, rather than entering a new area of a property through an exterior door, which may be confusing. As another example, when a user is brought near an area that was shown previously during the tour, the system may pan over to show the previously viewed area, which may allow the user to get their bearings within the property. For example, if the autoplay is generated to return along path 1062, a view may be added at waypoint 1050 to look towards waypoint 1052, which may allow a user to recognize the position of waypoint 1050.

In some instances, one or more of the rules or preferences described above may conflict with each other, which may depend on the specific property or other factors. For example, a preference to include certain rooms or features may conflict with a rule to take the shortest path through a property or to avoid paths that may be disorienting to a user. Accordingly, one or more of the rules may be weighted or prioritized to determine which rule should be given priority over others. In some embodiments, the weighting or priorities may be defined by an administrator (e.g., as default rankings). Alternatively or additionally, the weighting or priorities may be defined (or modified) by a user. In some embodiments, the weighting or priorities may depend on other factors, such as a property type, a property size, a number of waypoints, or various other factors. For example, for larger properties, it may be more important to shorten the path taken through a property as compared to smaller properties.

According to some embodiments, autoplay session data 820 may be generated at least partially using a trained machine learning model. Accordingly, while the various constraints or preferences for generating autoplay session data 820 are described above as "rules," in some embodiments, they may be inherent in the process used to generate autoplay session data 820. For example, a training algorithm, such as a neural network may receive training data in the form of image data (which may be in the form of virtual tour data), along with training autoplay session data associated with the images. As a result, a model may be trained to generate similar autoplay session data based on other captured virtual tour data. In some embodiments, this may also include a reward function approach that rewards correct or desirable selections. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

In some embodiments, the autoplay of the virtual tour may be at least partially configurable by a user, either before or after it has been generated. For example, a user such as an agent or a client may input one or more preferences, which may be used to generate the autoplay session. This may include, for example, a preference to spend more time viewing bedrooms, a preference on how quickly the tour progresses, a preference to view certain features (e.g., a water heater, patio, ceiling fixture, etc.), a desired percentage of a property to view, a preferred starting location within a property, or the like. In some embodiments, the user input may be provided prior to generation of autoplay session data 820, for example, by user 122 when virtual tour data 810 is initially captured and/or uploaded. Alternatively or additionally, the user input may be provided after autoplay session data 820 has been generated. For example, user 132 may begin or complete an autoplay of a virtual tour and wish to make changes to the views that are shown. Accordingly, user 132 may update various preferences, which may be used to update autoplay session data 820. For example, user 132 may think that the autoplay progressed too quickly and may change a speed preference through a user interface. User 132 may also update a preference to view utility spaces if they are of particular interest. Accordingly, autoplay session data 820 may be regenerated based on the preferences of user 132. In some embodiments, a user may modify an autoplay of the virtual tour after it has been generated. For example, this may include adding additional views, including or excluding waypoints, modifying a time a particular view is displayed, varying a pan or transition speed, redrawing a path between waypoints, or various other modifications. In some embodiments, a user interface may be provided to allow a user to edit or modify autoplay session data 820. For example, the user interface may include a display similar to the illustration of FIG. 9, and may include a toolbar with options to add views, edit a path between waypoints, enter custom duration values, or the like.

Figure 11:
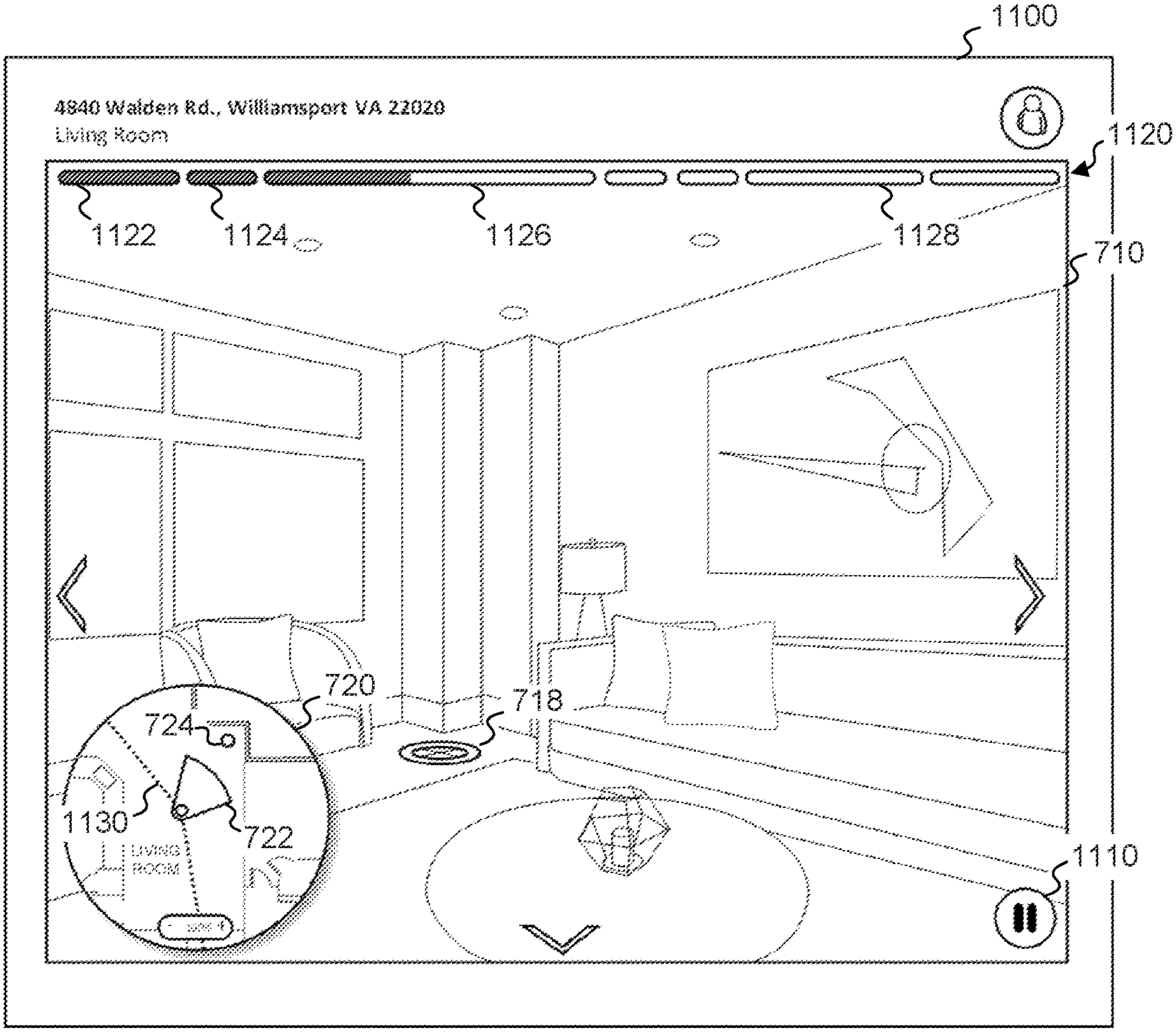
FIG. 11 illustrates an example interface for presenting an autoplay session of a virtual tour to a user, consistent with embodiments of the present disclosure.

The autoplay session may be presented to the user as an "autoplay" feature or option within a virtual tour. FIG. 11 illustrates an example interface 1100 for presenting an autoplay session of a virtual tour to a user, consistent with embodiments of the present disclosure. User interface 1100 may be similar to user interface 700 described above, but may be tailored to provide an autoplay function for a virtual tour, as described herein. Accordingly, any of the various embodiments or features described above with respect to user interface 700 may equally apply to user interface 1100. For example, user interface 1100 may include viewing pane 710 for displaying a particular view within a property. The view within viewing pane 710 may change as the autoplay progresses. User interface 1100 may also include various navigation elements, allowing the user to interact with the autoplay of the virtual tour, as described above. In this example, user interface 1100 may also include a play/pause autoplay element 1110 allowing the user to begin, pause, or end the autoplay functionality of a virtual tour. By "playing" the autoplay of the virtual tour, the views displayed in viewing pane 710 may proceed along the views and path defined by autoplay session data 820. In some embodiments, user interface 1100 may include a map element 720 as described above. In this example, map element 720 may include a path 1130 illustrating the path through property 600 defined by autoplay session data 820.

In some embodiments, the user may interact with various navigation elements, which may allow the user to resume control of navigating virtually through the property. Accordingly, the autoplay session may be paused or ended, allowing the user to navigate freely through virtual tour data 810, as described above with respect to user interface 700. For example, although no views are included in autoplay session data 820 for waypoint 950, user interface 1100 may include navigation elements 724 or 718, which may allow a user to navigate to views from within waypoint 950. Accordingly, the system may transition to a free movement mode in which the user may navigate freely within the property. In some embodiments, the system may resume an autoplay mode. For example, this may occur based on an interaction with the user to toggle autoplay element 1110, after a specified time has passed, or various other triggers. The autoplay may resume in various ways. In some embodiments, this may include regenerating autoplay session data 820 beginning at the current location (which may account for views that have already been presented during the current virtual tour). For example, from waypoint 950, a new path may be drawn to move to waypoint 960 and continue with the original route. Alternatively or additionally, the virtual tour may resume from the last point before the autoplay mode was ended. This may include jumping back to the last view that was shown in autoplay mode, or may include generating a transition (e.g., through additional waypoints and/or views) back to the last autoplay view to avoid disorientation of the user. As another example, if the user navigates to a waypoint or view included in autoplay session data 820, the autoplay may resume from the current location.

In some embodiments, the system may collect data associated with how a user interacts with the virtual tour, which may be used to improve the generation of the autoplay function. For example, if the user pauses the autoplay feature and turns to view a particular feature, this feature may be identified as a feature of interest. Accordingly, the system may modify or create rules or guidelines to focus more on this feature, either in this particular property, or in properties including this feature generally. For example, this may include updating weights for one or more rules, updating relative priorities or weighting for various feature types, providing feedback for training a machine learning model, or the like. In some embodiments, the inputs of other users, including inputs during virtual tours of other properties, may be used for updating a global set of rules applicable to all properties.

In some embodiments, user interface 1100 may include a progress bar 1120, as shown in FIG. 11. This may indicate the user's progress along the virtual tour. In some embodiments, the progress bar may be divided into various segments such as segments 1122, 1124, 1126 and 1128, with each segment being associated with a different region of a property. For example, each segment may be associated with a different room, floor, or other characteristic of the property. In the example, shown in FIG. 11, the user may have completed viewing rooms associated with segments 1122 and 1124 and may be partway through a room associated with segment 1126. In some embodiments, each segment may be labeled (e.g., with a room) type to enable a user to determine which portion of the autoplay corresponds to which segment. In some embodiments, progress bar 1120 may be interactive, such that the user may jump to different portions of the virtual tour by selecting a portion of the progress bar. In some embodiments, the progress bar may allow the user to preview other views along the virtual tour, for example, by showing thumbnail images when a user hovers over a spot on the progress bar. Various other information may be displayed when hovering over portions of progress bar 1120, such as a room description, a map showing a relevant area of the property, or the like.

Figure 12:
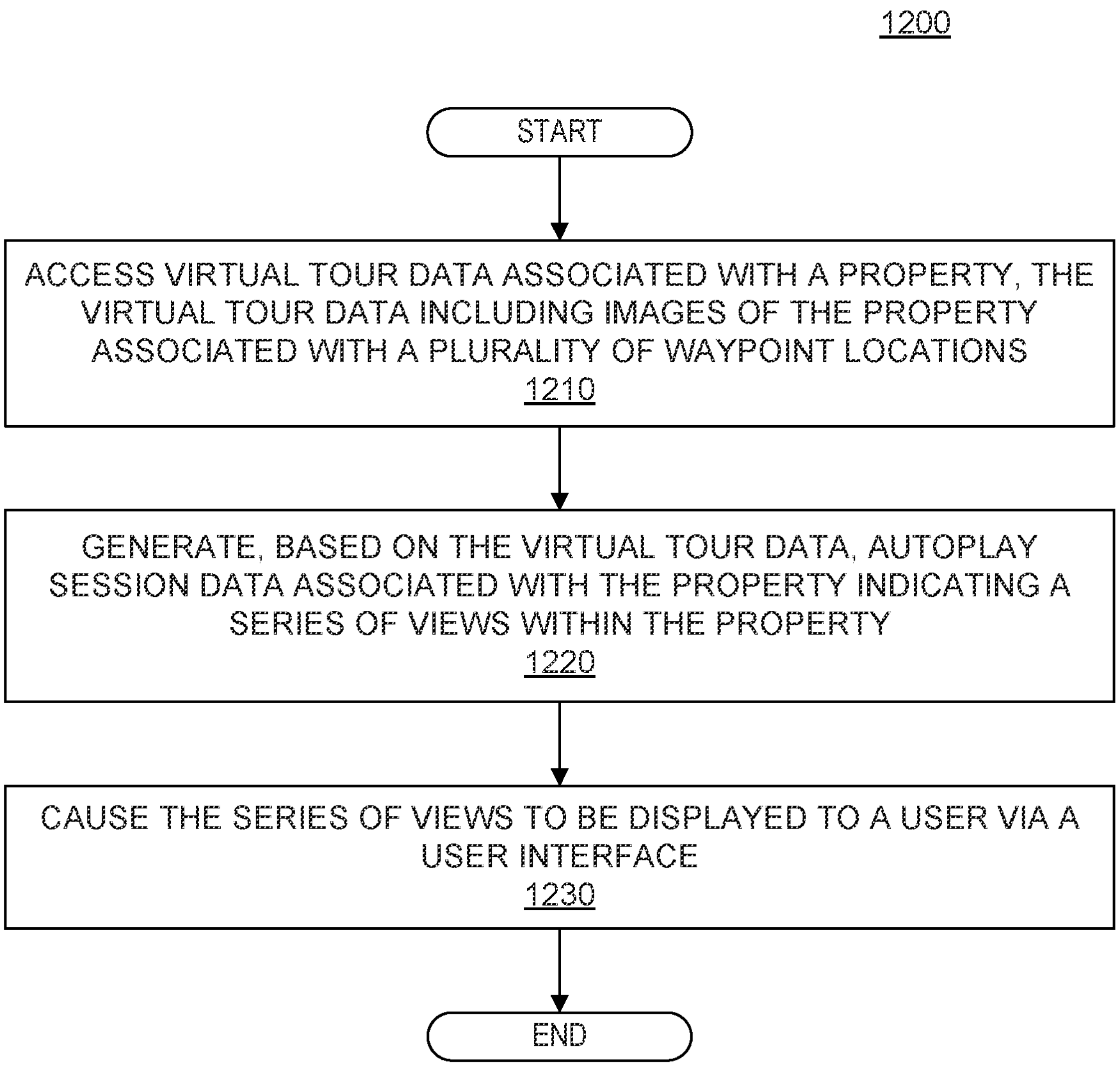
FIG. 12 is a flowchart showing an example process for generating an autoplay session, consistent with embodiments of the present disclosure.

FIG. 12 is a flowchart showing an example process 1200 for generating an autoplay session, consistent with embodiments of the present disclosure. In some embodiments, process 1200 may be performed by at least one processing device of a server, such as processor 210. Alternatively or additionally, some or all of process 1200 may be performed by another processing device of system 100, such as processor 310, processor 350, or processor 410. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 1200. Further, process 1200 is not necessarily limited to the steps shown in FIG. 12, and any steps or processes of the various embodiments described throughout the present disclosure may also be included in process 1200, including those described above with respect to FIGS. 8, 9, 10A, 10B, and 11.

In step 1210, process 1200 may include accessing virtual tour data associated with a property. For example, this may include accessing virtual tour data 810. As described above, virtual tour data may include a plurality of images captured within a property at various locations. For example, the virtual tour data may include at least a first image of the property associated with a first waypoint location and a second image of the property associated with a second waypoint location. The waypoint locations may be virtual locations within the virtual tour data that represent physical locations within the property, as described above. In some embodiments, the images may be composite or panoramic images captured at each waypoint location. For example, the first image may include a panoramic image captured at the first waypoint location. As used herein, a "first image" does not necessarily refer to the beginning or initial image within the autoplay session and the term "first" is used as a differentiating term relative to other images.

In step 1220, process 1200 may include automatically generating, based on the virtual tour data, autoplay session data associated with the property. For example, this may include generating autoplay session data 820, as described above. Accordingly, the autoplay session data may indicate a series of views within the property. For example, the series of views may include at least: a first view represented by at least a portion of the first image at the first waypoint location, and a second view represented by at least a portion of the second image at the second waypoint location. The autoplay session data may further indicate that the second view to be presented after the first view. In some embodiments, the first view may be selected based on at least one feature of interest represented in the first image. For example, the first view may correspond to view 994 and may be selected based on feature 902 being represented in the first image. Accordingly, automatically generating the autoplay session data may further include detecting at least one feature of interest based on application of at least one of a trained model or an image recognition algorithm to the first image, as described above. Alternatively or additionally, the first view may be selected based on a room associated with the first waypoint. For example, step 1220 may include classifying an area associated with the first waypoint location and the first view may be selected based on the classification of the area.

In some embodiments, the at least one feature of interest may include an architectural feature included in the property. For example, this may include a fireplace, a door, a window, a courtyard, a light fixture, a stairway, a vaulted ceiling, a patio, a balcony, a roof terrace, a pool or water feature, an archway, or any other type of architectural feature that may be of interest. As another example, the feature of interest includes a room adjacent to the first waypoint location, whereas the virtual tour data does not include a waypoint location within the room. For example, the first view may correspond to view 1024 and may be selected due to room 1002 not being associated with a waypoint location, as described above.

In some embodiments, at least one feature of interest may be identified based on input from a user. In some embodiments, the input may be a preference specified by a user in association with the current property. For example, the at least one feature of interest may be identified based on a preference specified by a user viewing the series of views (e.g., user 132), a user involved in capturing the virtual tour data (e.g., user 122), or any other user associated with the property. In some embodiments, the input may be input received in association with additional autoplay session data, the additional autoplay session data being associated with a different property. For example, the additional autoplay session data may include a series of views of the different property, and the at least one input may include navigation by an additional user to a view not included in the series of views. For example, if users commonly turn to view a particular type of feature, such as a bathtub, the system may learn to recognize similar features and classify them as features of interest when generating future autoplay session data.

According to some embodiments, the autoplay session data may further indicate durations to present each of the series of views, as described above. Accordingly, the autoplay session data may further include a first duration to present the first view and a second duration to present the second view, where the first duration is different from the second duration. In some embodiments, the first duration is determined based on at least one feature of interest represented in the first image. For example, less time may be dedicated to displaying images of a hallway compared to images in rooms. The autoplay session data may similarly include fewer views associated with a hallway compared to a room, thereby reducing the time spent in the hallway.

In some embodiments, the autoplay session data may include multiple views at each waypoint. Accordingly, the series of views may further include a third view at the second waypoint location and the autoplay session data may include instructions to pan from the second view to the third view. For example, the second view may correspond to view 962 and the third view may correspond to view 964. In some embodiments, the second view may be selected to maintain a heading direction between the first waypoint location and the second waypoint location. For example, to avoid the user becoming disoriented, when traveling towards a wall, the second view may initially face the wall to avoid the user becoming disoriented and then autoplay would pan toward the third view. Accordingly, the second view may correspond to view 1032 and the third view may correspond to view 1034, as described above.

According to some embodiments, the autoplay session data may be generated with a preference for retracing steps through the property to avoid the user becoming disoriented. For example, the virtual tour data further includes a third image of the property associated with a third waypoint location. The series of views may further include a third view represented by at least a portion of the third image at the third waypoint location, the third view to be presented after the second view. To avoid confusion, in transitioning from the second view at the second waypoint location to the third view at the third waypoint location, the autoplay session data may include instructions to return to the first waypoint location before moving to the third waypoint location. Accordingly, the series of views may further include a fourth view at the first waypoint location, the fourth view to be presented after the second view and before the third view.

The autoplay session data may not necessarily include views at all waypoint locations represented in the virtual tour data. For example, the virtual tour data may further include a third image of the property associated with a third waypoint location. In some embodiments, step 1220 may include omitting a third view associated with the third waypoint location from the series of views based on an attribute of a room associated with the third waypoint. For example, the attribute of the room associated with the third waypoint may include the size of the room, a determination that the room is represented in at least one of the first view or the second view, or various other factors described above.

In step 1230, process 1200 may include causing the series of views to be displayed to a user via a user interface. For example, this may include causing user interface 1100 to be displayed on a device such as computing device 130. The user interface may be configured to allow a user to navigate to a third view not included in the series of views based on a user input. For example, the user interface may receive a navigation input from user 132 associated with waypoint 950, as described above. The user interface may include various other navigational features, including an interactive progress bar (i.e., progress bar 1120), a map overlay (i.e., map element 720), controls for pausing or resuming an autoplay mode or session (i.e., autoplay element 1110), or any other features described above.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, Python, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer readable medium including instructions that, when executed by at least one processor, cause the at least one processor to perform operations for generating an autoplay session, the operations comprising:
- accessing virtual tour data associated with a property, the virtual tour data including at least a first image of the property associated with a first waypoint location and a second image of the property associated with a second waypoint location;
- automatically generating, based on the virtual tour data, autoplay session data associated with the property, the autoplay session data indicating a series of views within the property to be displayed in sequential order during an autoplay session, wherein automatically generating the autoplay session data includes:
  - selecting a first view represented by at least a portion of the first image at the first waypoint location, the first view being selected based on at least one feature of interest represented in the first image, the at least one feature of interest being detected within the virtual tour data based on application of a trained model to at least a portion of the virtual tour data; and
  - selecting a second view represented by at least a portion of the second image at the second waypoint location, the second view being selected to be presented after the first view; and
- causing the series of views to be displayed to a user via a user interface.

2. The non-transitory computer readable medium of claim 1, wherein the at least one feature of interest includes an architectural feature included in the property.

3. The non-transitory computer readable medium of claim 1, wherein the feature of interest includes a room adjacent to the first waypoint location, wherein the virtual tour data does not include a waypoint location within the room.

4. The non-transitory computer readable medium of claim 1, wherein the at least one feature of interest is determined based on at least one input received in association with additional autoplay session data, the additional autoplay session data being associated with a different property.

5. The non-transitory computer readable medium of claim 4, wherein the additional autoplay session data includes a series of views of the different property, and wherein the at least one input includes navigation by an additional user to a view not included in the series of views.

6. The non-transitory computer readable medium of claim 1, wherein the operations further include classifying an area associated with the first waypoint location and wherein the first view is further selected based on the classification of the area.

7. The non-transitory computer readable medium of claim 1, wherein the at least one feature of interest is identified based on a preference specified by the user.

8. The non-transitory computer readable medium of claim 1, wherein the autoplay session data further includes a first duration to present the first view and a second duration to present the second view, the first duration being different from the second duration.

9. The non-transitory computer readable medium of claim 8, wherein the first duration is determined based on the at least one feature of interest represented in the first image.

10. The non-transitory computer readable medium of claim 1, wherein the series of views further includes a third view at the second waypoint location, and wherein the autoplay session data includes instructions to pan from the second view to the third view.

11. The non-transitory computer readable medium of claim 10, wherein the second view is selected to maintain a heading direction between the first waypoint location and the second waypoint location.

12. The non-transitory computer readable medium of claim 1, wherein the virtual tour data further includes a third image of the property associated with a third waypoint location and wherein the series of views further includes a third view represented by at least a portion of the third image at the third waypoint location, the third view to be presented after the second view.

13. The non-transitory computer readable medium of claim 12, wherein the series of views further includes a fourth view at the first waypoint location, the fourth view to be presented after the second view and before the third view.

14. The non-transitory computer readable medium of claim 1, wherein the virtual tour data further includes a third image of the property associated with a third waypoint location and wherein automatically generating the autoplay session data includes omitting a third view associated with the third waypoint location from the series of views based on an attribute of a room associated with the third waypoint.

15. The non-transitory computer readable medium of claim 14, wherein the attribute of the room associated with the third waypoint includes at least one of a size of the room or a determination that the room is represented in at least one of the first view or the second view.

16. The non-transitory computer readable medium of claim 1, wherein the user interface is configured to allow a user to navigate to a third view not included in the series of views based on a user input.

17. The non-transitory computer readable medium of claim 1, wherein the first image includes a 360-degree panoramic image captured at the first waypoint location.

18. A system for generating an autoplay session, the system comprising:

at least one processor configured to:

access virtual tour data associated with a property, the virtual tour data including at least a first image of the property associated with a first waypoint location and a second image of the property associated with a second waypoint location;

automatically generate, based on the virtual tour data, autoplay session data associated with the property, the autoplay session data indicating a series of views within the property to be displayed in sequential order during an autoplay session, wherein automatically generating the autoplay session data includes:

selecting a first view represented by at least a portion of the first image at the first waypoint location, the first view being selected based on at least one feature of interest represented in the first image, the at least one feature of interest being detected within the virtual tour data based on application of a trained model to at least a portion of the virtual tour data, and selecting a second view represented by at least a portion of the second image at the second waypoint location, the second view being selected to be presented after the first view; and cause the series of views to be displayed to a user via a user interface.

19. A computer-implemented method for generating an autoplay session, the method comprising:

accessing virtual tour data associated with a property, the virtual tour data including at least a first image of the property associated with a first waypoint location and a second image of the property associated with a second waypoint location;

automatically generating, based on the virtual tour data, autoplay session data associated with the property, the autoplay session data indicating a series of views within the property to be displayed in sequential order during an autoplay session, wherein automatically generating the autoplay session data includes:

selecting a first view represented by at least a portion of the first image at the first waypoint location, the first view being selected based on at least one feature of interest represented in the first image, the at least one feature of interest being detected within the virtual tour data based on application of a trained model to at least a portion of the virtual tour data, and selecting a second view represented by at least a portion of the second image at the second waypoint location, the second view being selected to be presented after the first view; and causing the series of views to be displayed to a user via a user interface.

* * * * *